United States Patent
Hirano

(10) Patent No.: US 9,766,436 B2
(45) Date of Patent: Sep. 19, 2017

(54) ZOOM LENS HAVING FIRST THROUGH FIFTH LENS GROUPS AND A SPECIFIC FOCAL DISTANCE RATIO AMONG THE LENS GROUPS

(71) Applicant: CBC CO., LTD., Tokyo (JP)

(72) Inventor: Katsuya Hirano, Tokyo (JP)

(73) Assignee: CBC Co., Ltd. (JP)

( * ) Notice: Subject to any disclaimer, the term of this patent is extended or adjusted under 35 U.S.C. 154(b) by 0 days.

(21) Appl. No.: 14/892,822

(22) PCT Filed: Jun. 4, 2013

(86) PCT No.: PCT/JP2013/065495
§ 371 (c)(1),
(2) Date: Nov. 20, 2015

(87) PCT Pub. No.: WO2014/196022
PCT Pub. Date: Dec. 11, 2014

(65) Prior Publication Data
US 2016/0091692 A1    Mar. 31, 2016

(51) Int. Cl.
*G02B 15/14* (2006.01)
*G02B 13/00* (2006.01)
(Continued)

(52) U.S. Cl.
CPC ......... *G02B 13/009* (2013.01); *G02B 15/173* (2013.01); *G02B 27/0025* (2013.01)

(58) Field of Classification Search
CPC ............................. G02B 15/14; G02B 13/009
(Continued)

(56) References Cited

U.S. PATENT DOCUMENTS

2004/0184160 A1    9/2004  Nishina et al.
2005/0185288 A1    8/2005  Nishina et al.
(Continued)

FOREIGN PATENT DOCUMENTS

JP    H0460509 A    2/1992
JP    H0876193 A    3/1996
(Continued)

*Primary Examiner* — Bumsuk Won
*Assistant Examiner* — Tamara Y Washington
(74) *Attorney, Agent, or Firm* — Harness, Dickey & Pierce, P.L.C.

(57) ABSTRACT

There is provided a zoom lens, consisting of sequentially from an object side: a first lens group having a positive refractive power and a focusing function; a second lens group having a negative refractive power and having a variator function of performing zooming; a third lens group having a positive refractive power and a diaphragm; a fourth lens group having a positive refractive power, and having a compensator function of correcting a position of an imaging plane at the time of zooming; and a fifth lens group having a positive or negative refractive power, wherein the second lens group is moved to the imaging plane side from the object side along an optical axis, and the fourth lens group is moved along the optical axis in a state of fixing the first lens group, the third lens group, and the fifth lens group at the time of zooming from a wide angle end to a telephoto end, and only the first lens group is moved along the optical axis at the time of focusing.

9 Claims, 45 Drawing Sheets

(51) Int. Cl.
*G02B 15/173* (2006.01)
*G02B 27/00* (2006.01)

(58) Field of Classification Search
USPC .................................................. 359/683–690
See application file for complete search history.

(56) References Cited

U.S. PATENT DOCUMENTS

| | | |
|---|---|---|
| 2005/0195492 A1 | 9/2005 | Nishina et al. |
| 2005/0195493 A1 | 9/2005 | Nishina et al. |
| 2008/0212201 A1 | 9/2008 | Sato |
| 2010/0128361 A1 | 5/2010 | Shirota |
| 2010/0296172 A1* | 11/2010 | Omichi ................ G02B 15/173 359/687 |
| 2012/0320251 A1 | 12/2012 | Saito |

FOREIGN PATENT DOCUMENTS

| | | |
|---|---|---|
| JP | 2004333664 A | 11/2004 |
| JP | 2006023593 A | 1/2006 |
| JP | 2006039005 A | 2/2006 |
| JP | 2006171492 A | 6/2006 |
| JP | 2008209741 A | 9/2008 |
| JP | 2008241884 A | 10/2008 |
| JP | 2010128032 A | 6/2010 |
| JP | 2010128034 A | 6/2010 |
| JP | 20133240 A | 1/2013 |

* cited by examiner

EXAMPLE1

| | SURFACE NUMBER Ni | r(mm) | d(mm) | nd | vd |
|---|---|---|---|---|---|
| G1 | 1 | 443.81 | 2.70 | 1.83400 | 37.2 |
| | 2 | 126.75 | 9.73 | 1.49700 | 81.6 |
| | 3 | -958.49 | 0.25 | | |
| | 4 | 134.59 | 8.72 | 1.49700 | 81.6 |
| | 5 | -4218.60 | 0.25 | | |
| | 6 | 121.04 | 6.63 | 1.49700 | 81.6 |
| | 7 | 395.41 | A | | |
| G2 | 8 | 148.45 | 1.50 | 1.88300 | 40.8 |
| | 9 | 30.14 | 3.87 | | |
| | 10 | -45.17 | 1.35 | 1.88300 | 40.8 |
| | 11 | 34.90 | 1.06 | | |
| | 12 | 37.87 | 3.80 | 1.95906 | 17.5 |
| | 13 | 715.69 | B | | |
| G3 | DIAPHRAGM | ∞ | 1.70 | | |
| | 14 | 493.45 | 3.64 | 1.83481 | 42.7 |
| | 15 | -103.39 | 0.20 | | |
| | 16 | 52.65 | 3.49 | 1.49700 | 81.6 |
| | 17 | -136.81 | 0.20 | | |
| | 18 | 28.60 | 5.68 | 1.49700 | 81.6 |
| | 19 | -72.14 | 1.20 | 1.88300 | 40.8 |
| | 20 | 36.90 | C | | |
| G4 | 21 | 106.53 | 2.61 | 1.59270 | 35.3 |
| | 22 | -103.97 | 0.20 | | |
| | 23 | 30.93 | 1.00 | 1.84666 | 23.8 |
| | 24 | 17.93 | 4.65 | 1.69100 | 54.8 |
| | 25 | 180.54 | D | | |
| G5 | 26 | 198.78 | 7.29 | 1.85026 | 32.3 |
| | 27 | -13.17 | 1.30 | 1.80610 | 40.9 |
| | 28 | 12.46 | 3.49 | | |
| | 29 | 40.20 | 3.70 | 1.69680 | 55.5 |
| | 30 | -36.90 | 14.47 | | |

FIG.2A

| EXAMPLE1 | WIDE ANGLE END | INTERMEDIATE AREA | TELEPHOTO END |
|---|---|---|---|
| FOCAL DISTANCE(mm) | 10.30 | 75.00 | 300.70 |
| F NUMBER | 1.85 | 2.62 | 3.99 |
| HALF ANGLE OF VIEW(°) | 24.19 | 3.31 | 0.82 |
| A (mm) | 1.50 | 88.80 | 119.15 |
| B (mm) | 120.85 | 33.55 | 3.20 |
| C (mm) | 18.44 | 8.27 | 18.71 |
| D (mm) | 2.10 | 12.27 | 1.83 |
| TOTAL OPTICAL LENGTH(mm) | | | 239.66 |
| TELEPHOTO RATIO | | | 0.80 |

FIG.2B

| EXAMPLE1 | |
|---|---|
| $f1/ft$ | 0.52 |
| $f4/f2$ | 1.67 |
| $f3/f4$ | 1.55 |
| $\beta t4/\beta w4$ | 1.02 |
| $\beta t4$ | 0.39 |
| n5A | 1.85026 |
| n5B | 1.80440 |

FIG.2C

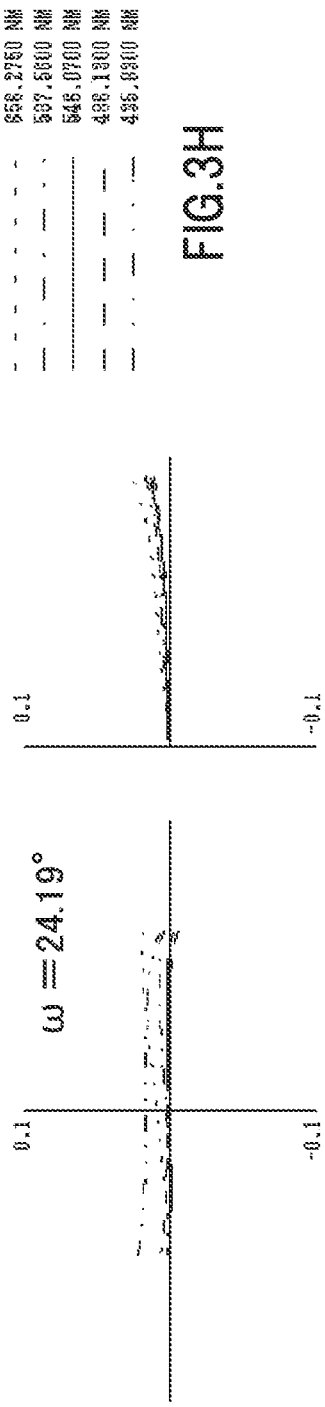
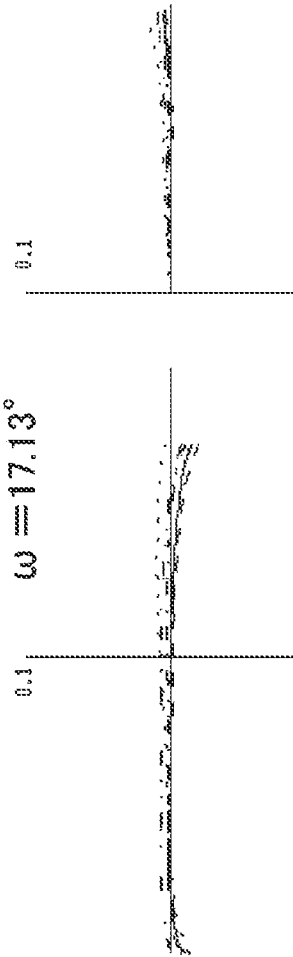
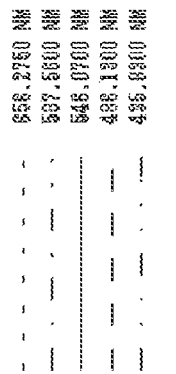

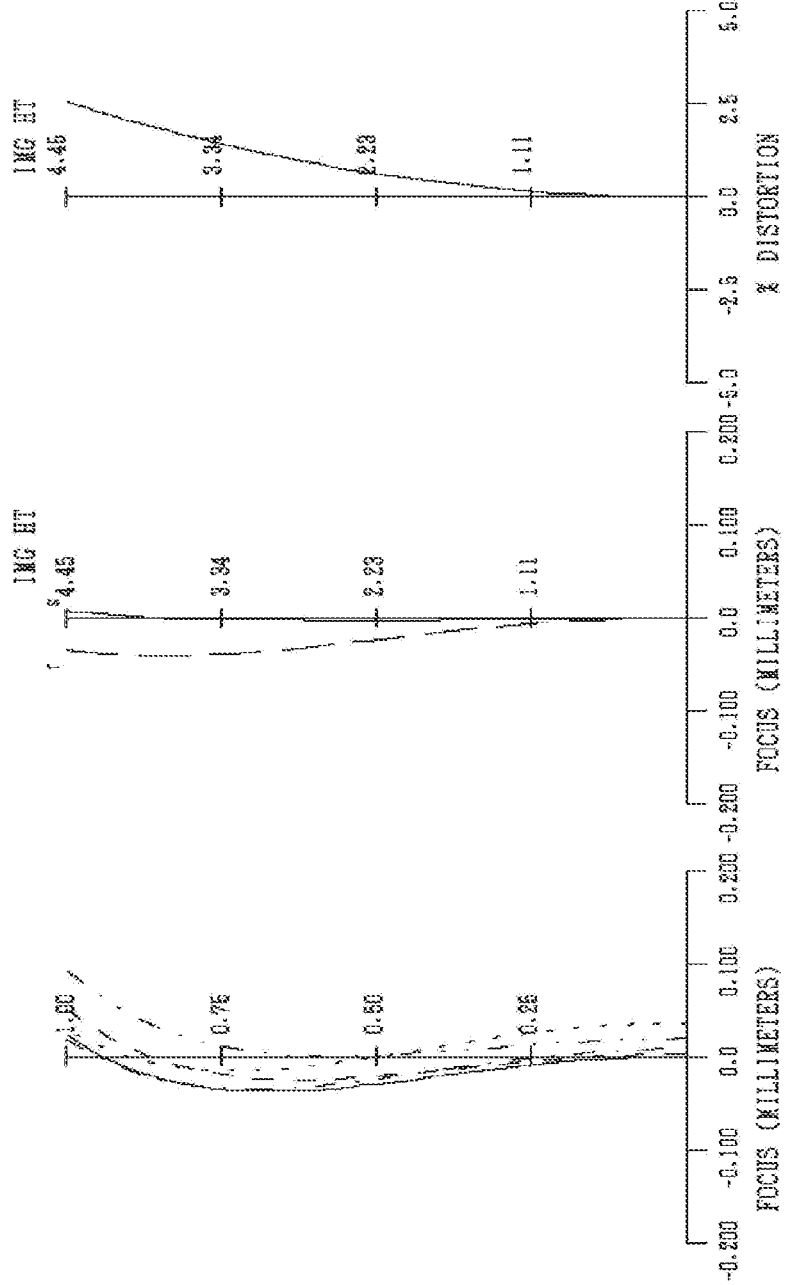

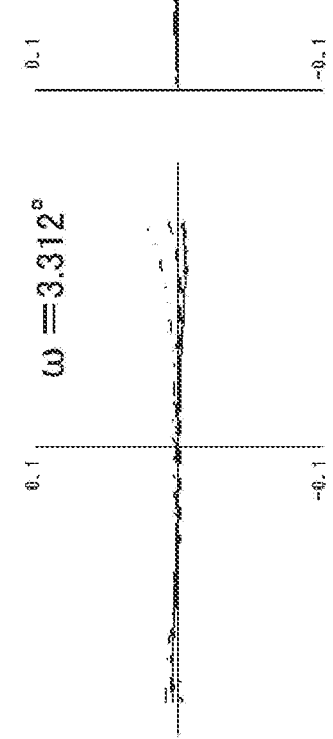
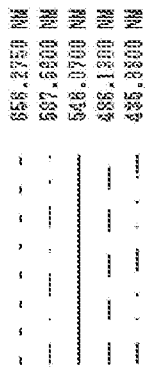
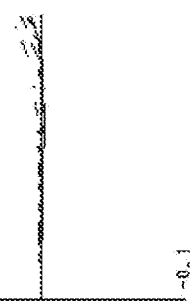
FIG.4D  FIG.4E  FIG.4H
FIG.4F  FIG.4G

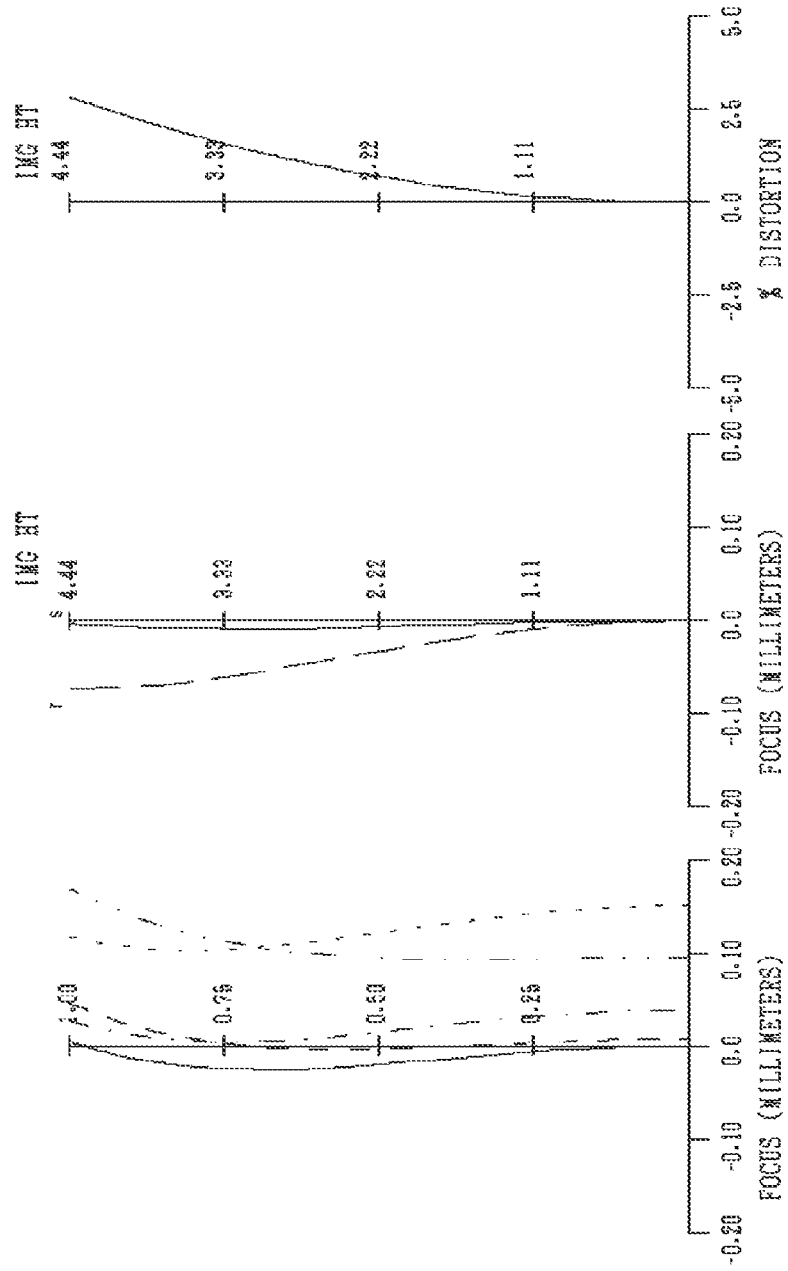

EXAMPLE1 TELEPHOTO END

FIG.5D
FIG.5E
FIG.5F
FIG.5G
FIG.5H

EXAMPLE2

| | SURFACE NUMBER Ni | r(mm) | d(mm) | nd | vd |
|---|---|---|---|---|---|
| G1 | 1 | 134.02 | 2.70 | 1.83400 | 37.2 |
| | 2 | 62.42 | 8.56 | 1.49700 | 81.6 |
| | 3 | -318.31 | 0.25 | | |
| | 4 | 58.31 | 7.22 | 1.49700 | 81.6 |
| | 5 | 575.92 | A | | |
| G2 | 6 | -463.05 | 1.50 | 1.88300 | 40.8 |
| | 7 | 27.14 | 3.13 | | |
| | 8 | -42.56 | 1.35 | 1.74320 | 49.3 |
| | 9 | 24.15 | 1.09 | | |
| | 10 | 26.73 | 3.44 | 1.95906 | 17.5 |
| | 11 | 87.73 | B | | |
| G3 | DIAPHRAGM | ∞ | 1.70 | | |
| | 12 | 493.45 | 3.64 | 1.83481 | 42.7 |
| | 13 | -103.39 | 0.20 | | |
| | 14 | 52.65 | 3.49 | 1.49700 | 81.6 |
| | 15 | -136.81 | 0.20 | | |
| | 16 | 28.60 | 5.68 | 1.49700 | 81.6 |
| | 17 | -72.14 | 1.20 | 1.88300 | 40.8 |
| | 18 | 36.90 | C | | |
| G4 | 19 | 106.53 | 2.61 | 1.88300 | 40.8 |
| | 20 | -103.97 | 0.20 | | |
| | 21 | 30.93 | 1.00 | 1.84666 | 23.8 |
| | 22 | 17.93 | 4.65 | 1.61800 | 63.3 |
| | 23 | 180.54 | D | | |
| G5 | 24 | 198.78 | 7.29 | 1.85026 | 32.3 |
| | 25 | -13.17 | 1.30 | 1.80440 | 39.6 |
| | 26 | 12.46 | 3.49 | | |
| | 27 | 40.20 | 3.70 | 1.72000 | 43.7 |
| | 28 | -36.90 | 14.47 | | |

FIG.7A

EXAMPLE2

| | WIDE ANGLE END | INTERMEDIATE AREA | TELEPHOTO END |
|---|---|---|---|
| FOCAL DISTANCE(mm) | 10.30 | 75.00 | 191.00 |
| F NUMBER | 1.85 | 2.38 | 3.74 |
| HALF ANGLE OF VIEW(°) | 24.55 | 3.32 | 1.30 |
| A(mm) | 1.50 | 55.29 | 70.49 |
| B(mm) | 72.19 | 18.40 | 3.20 |
| C(mm) | 10.01 | 2.95 | 10.01 |
| D(mm) | 1.91 | 8.96 | 1.91 |
| TOTAL OPTICAL LENGTH(mm) | | | 169.66 |
| TELEPHOTO RATIO | | | 0.89 |

FIG.7B

EXAMPLE2

| $f1/ft$ | 0.52 |
|---|---|
| $f4/|f2|$ | 1.67 |
| $f3/f4$ | 1.83 |
| $\beta t4/\beta w4$ | 1.00 |
| $\beta t4$ | 0.23 |
| n5A | 1.85026 |
| n5B | 1.80440 |

FIG.7C

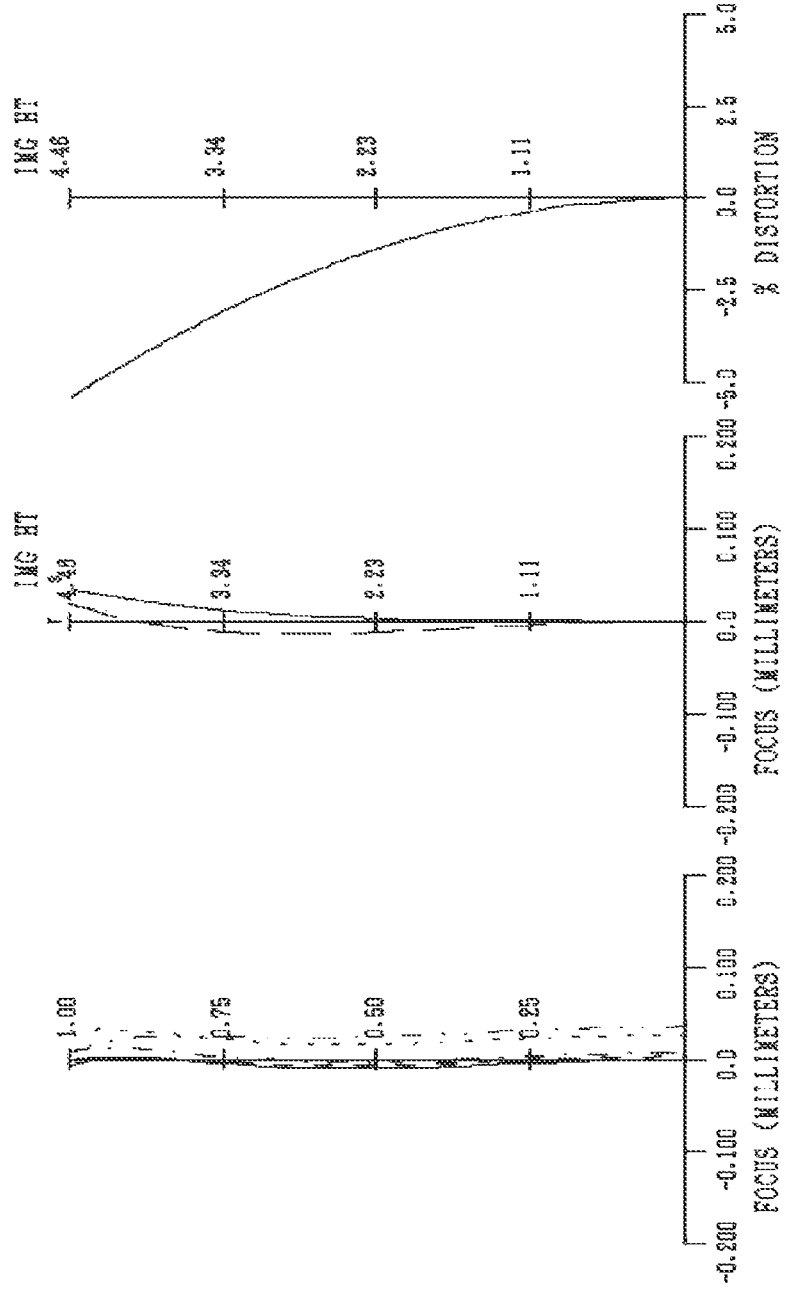

EXAMPLE2 WIDE ANGLE END
FIG.8D
ω = 24.55°
TANGENTIAL
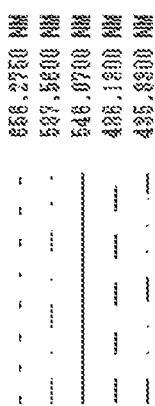
FIG.8E
SAGITTAL
FIG.8F
ω = 17.26°
FIG.8G
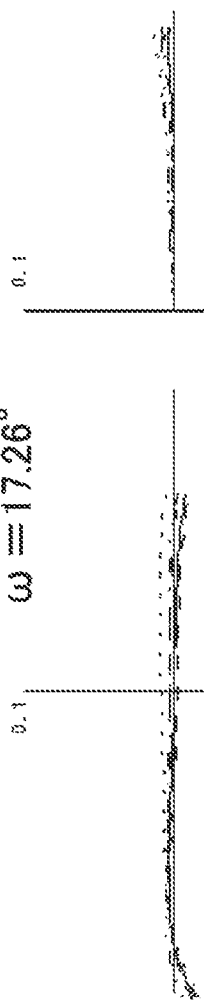
656.2720 NM
587.5600 NM
546.0700 NM
486.1300 NM
435.8300 NM
FIG.8H

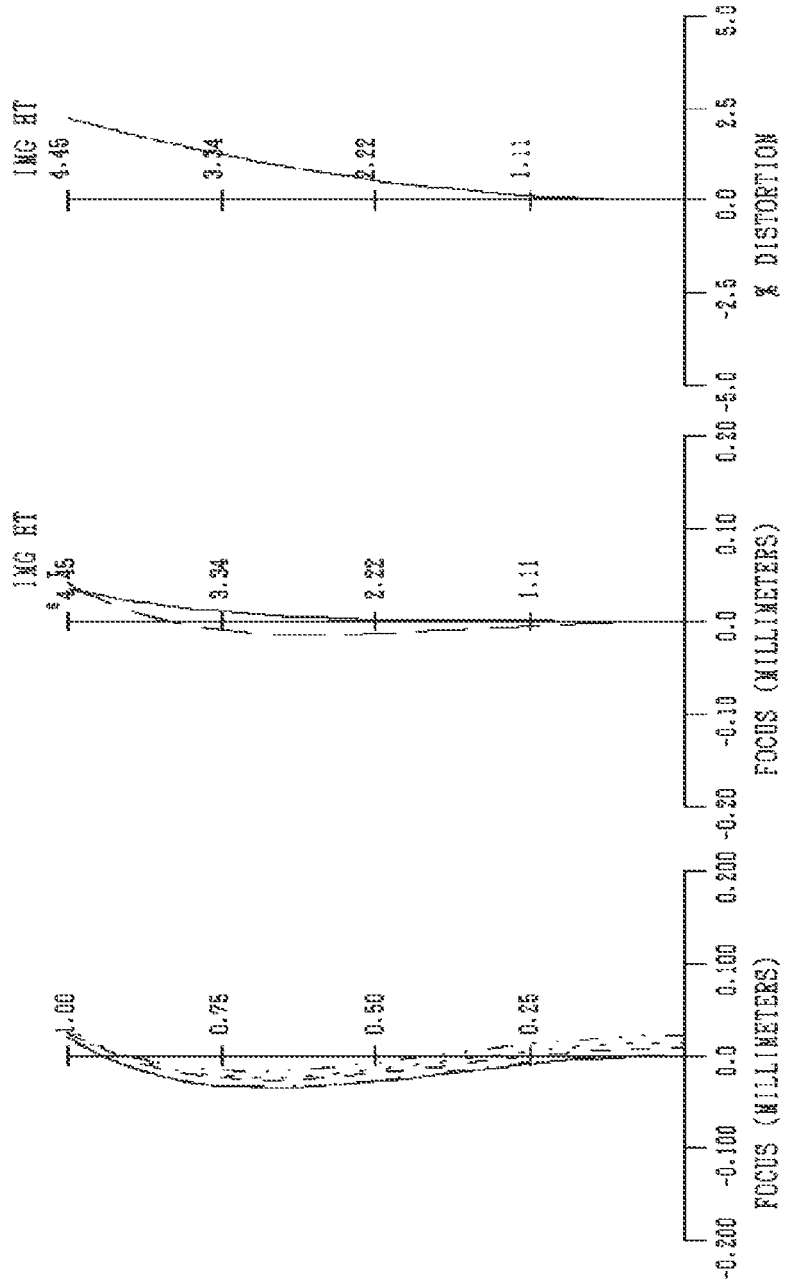

EXAMPLE2 INTERMEDIATE AREA
FIG.9D
FIG.9E
FIG.9F
FIG.9G
FIG.9H

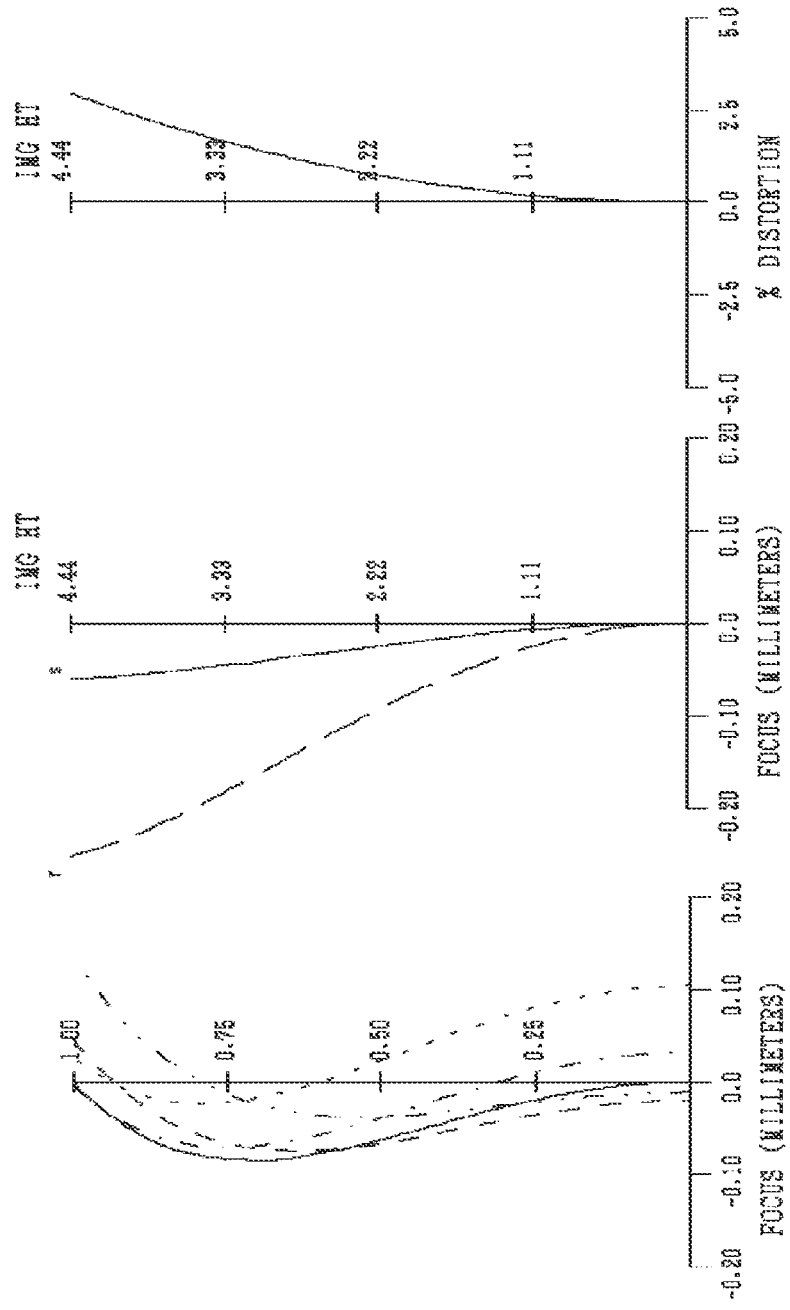
FIG.10A EXAMPLE2 TELEPHOTO END LONGITUDINAL SPHERICAL ABER.
FIG.10B ASTIGMATIC FIELD CURVES
FIG.10C DISTORTION

EXAMPLE2 TELEPHOTO END
TANGENTIAL                    SAGITTAL

EXAMPLE3

| | SURFACE NUMBER Ni | r(mm) | d(mm) | nd | vd |
|---|---|---|---|---|---|
| G1 | 1 | 173.76 | 2.50 | 1.83400 | 37.2 |
| | 2 | 80.12 | 10.06 | 1.49700 | 81.6 |
| | 3 | -385.36 | 0.25 | | |
| | 4 | 74.73 | 8.32 | 1.49700 | 81.6 |
| | 5 | 657.80 | A | | |
| G2 | 6 | 1006.03 | 1.50 | 1.80610 | 40.9 |
| | 7 | 29.52 | 3.36 | | |
| | 8 | -49.46 | 1.35 | 1.83481 | 42.7 |
| | 9 | 28.22 | 1.09 | | |
| | 10 | 30.96 | 3.49 | 1.95906 | 17.5 |
| | 11 | 151.01 | B | | |
| G3 | DIAPHRAGM | ∞ | 1.70 | | |
| | 12 | 151.89 | 3.64 | 1.83481 | 42.7 |
| | 13 | -82.69 | 0.20 | | |
| | 14 | 42.51 | 3.51 | 1.49700 | 81.6 |
| | 15 | 160.79 | 0.20 | | |
| | 16 | 27.18 | 5.87 | 1.49700 | 81.6 |
| | 17 | -59.88 | 1.00 | 1.83400 | 37.2 |
| | 18 | 36.67 | C | | |
| G4 | 19 | 87.96 | 2.57 | 1.69350 | 53.2 |
| | 20 | -146.45 | 0.20 | | |
| | 21 | 28.60 | 1.00 | 1.85026 | 32.3 |
| | 22 | 15.05 | 4.42 | 1.65160 | 58.6 |
| | 23 | 837.16 | D | | |
| G5 | 24 | -485.20 | 3.49 | 1.71736 | 29.5 |
| | 25 | -13.43 | 1.10 | 1.67300 | 38.2 |
| | 26 | 13.19 | 8.54 | | |
| | 27 | 40.29 | 2.70 | 1.74320 | 49.3 |
| | 28 | -48.54 | 14.46 | | |

FIG.12A

| EXAMPLE3 | WIDE ANGLE END | INTERMEDIATE AREA | TELEPHOTO END |
|---|---|---|---|
| FOCAL DISTANCE(mm) | 10.30 | 75.00 | 232.58 |
| F NUMBER | 1.85 | 2.44 | 3.69 |
| HALF ANGLE OF VIEW(°) | 24.57 | 3.34 | 1.07 |
| A (mm) | 1.50 | 71.95 | 94.50 |
| B (mm) | 96.20 | 25.75 | 3.20 |
| C (mm) | 11.56 | 3.21 | 11.59 |
| D (mm) | 1.88 | 10.24 | 1.85 |
| TOTAL OPTICAL LENGTH(mm) | | | 197.66 |
| TELEPHOTO RATIO | | | 0.85 |

FIG.12B

| EXAMPLE3 | |
|---|---|
| f1/ft | 0.55 |
| f4/\|f2\| | 1.71 |
| f3/f4 | 1.43 |
| β t4/β w4 | 1.00 |
| β t4 | 0.37 |
| n5A | 1.71736 |
| n5B | 1.67300 |

FIG.12C

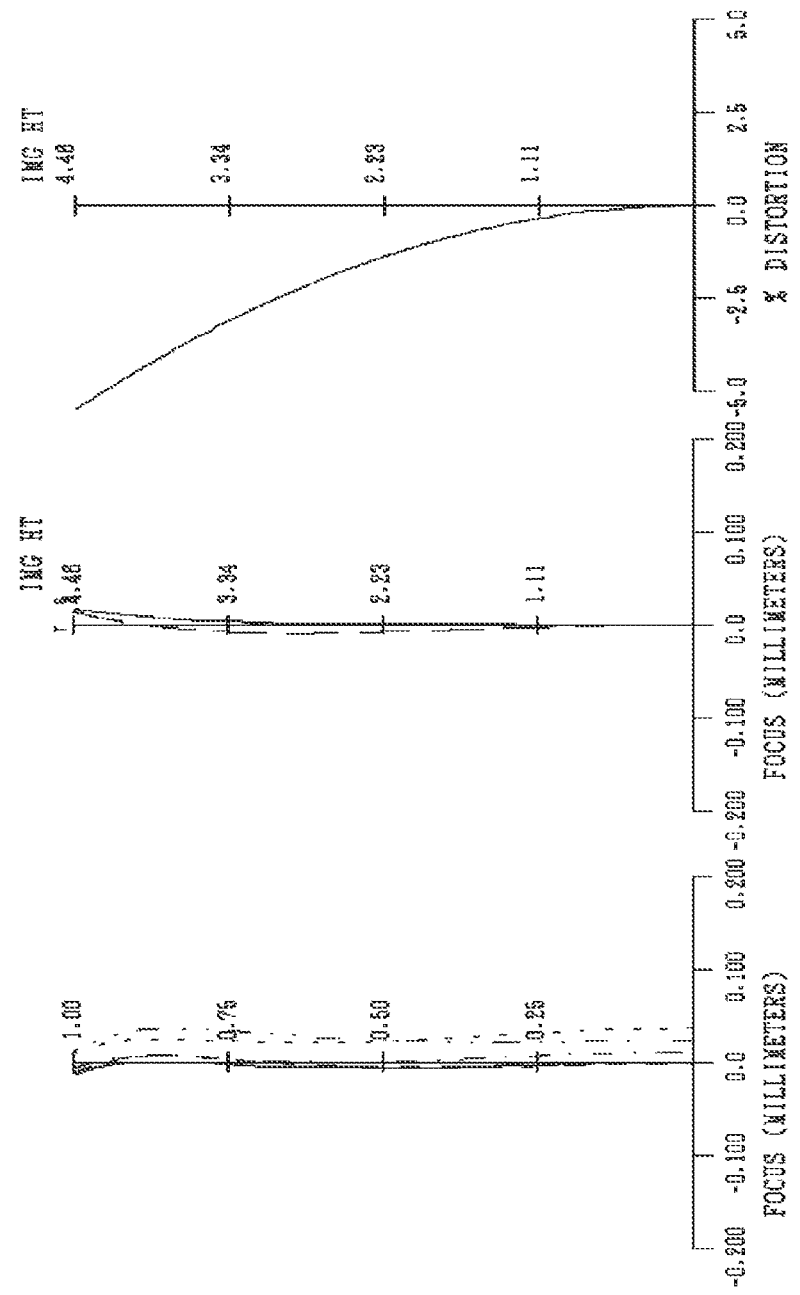

EXAMPLE3 WIDE ANGLE END

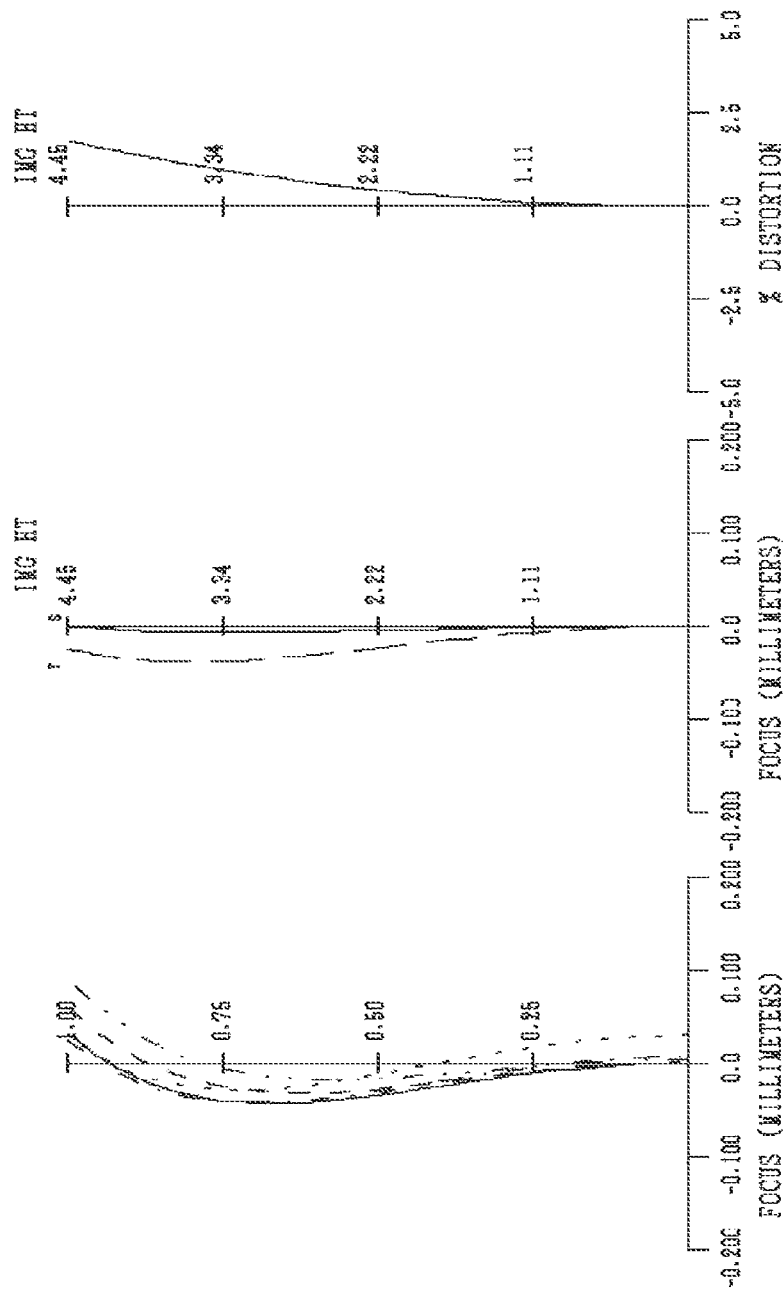

EXAMPLE3 INTERMEDIATE AREA
TANGENTIAL

SAGITTAL

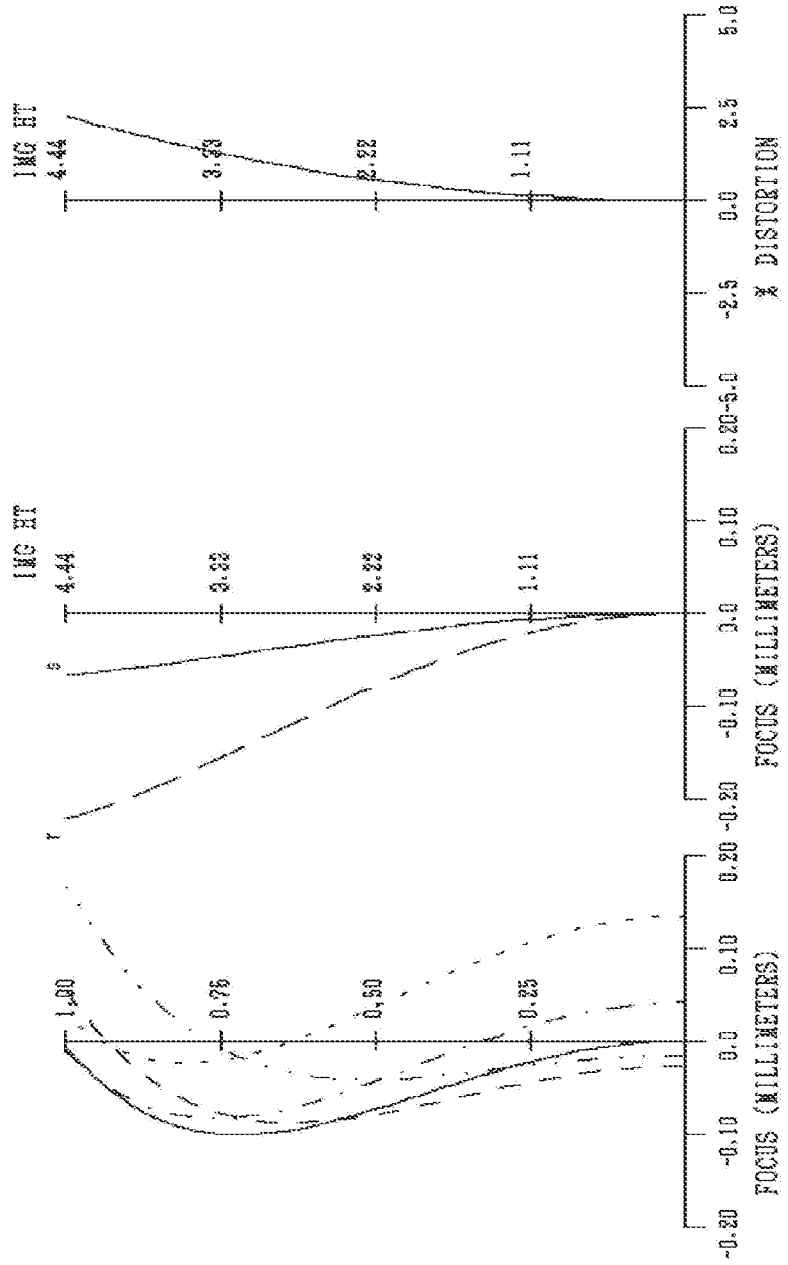

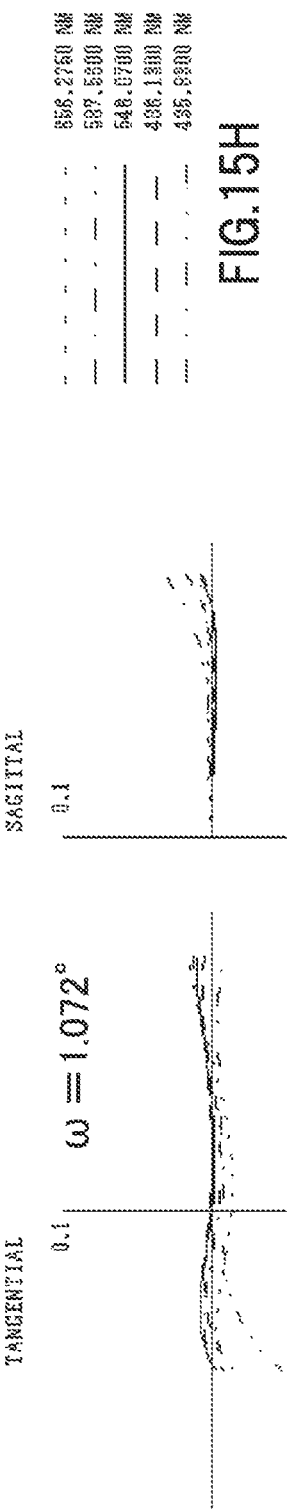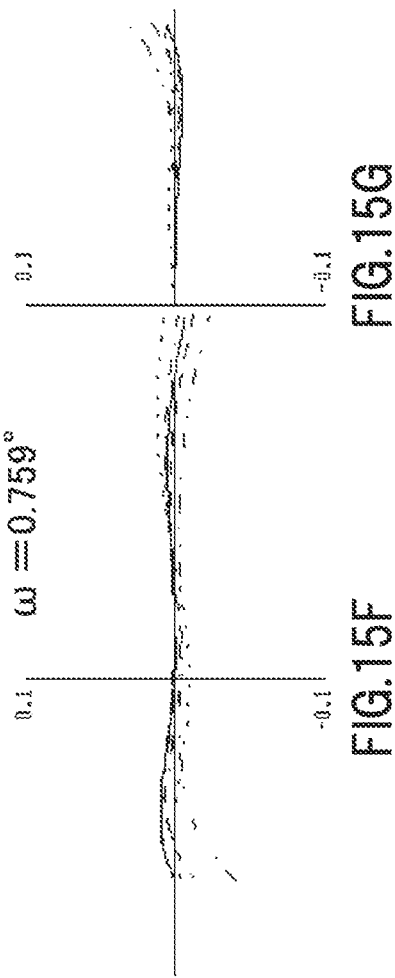

EXAMPLE4

| | SURFACE NUMBER Ni | r(mm) | d(mm) | nd | vd |
|---|---|---|---|---|---|
| G1 | 1 | 128.16 | 2.50 | 1.83400 | 37.2 |
| | 2 | 68.89 | 1.10 | | |
| | 3 | 68.89 | 9.65 | 1.49700 | 81.6 |
| | 4 | -1900.00 | 0.25 | | |
| | 5 | 81.12 | 7.70 | 1.49700 | 81.6 |
| | 6 | 1656.00 | A | | |
| G2 | 7 | 2450.00 | 1.50 | 1.83481 | 42.7 |
| | 8 | 17.60 | 4.64 | | |
| | 9 | -58.00 | 1.30 | 1.83481 | 42.7 |
| | 10 | 96.87 | 0.20 | | |
| | 11 | 32.96 | 3.60 | 1.92286 | 18.9 |
| | 12 | 202.86 | B | | |
| G3 | DIAPHRAGM | ∞ | 0.70 | | |
| | 13 | ∞ | 1.00 | 1.51633 | 64.1 |
| | 14 | ∞ | 1.60 | | |
| | 15 | 261.65 | 3.65 | 1.83481 | 42.7 |
| | 16 | -67.54 | 0.20 | | |
| | 17 | 56.21 | 3.45 | 1.49700 | 81.6 |
| | 18 | 514.95 | 0.20 | | |
| | 19 | 32.39 | 5.75 | 1.48749 | 70.2 |
| | 20 | -45.99 | 1.45 | 1.83400 | 37.2 |
| | 21 | 45.99 | C | | |
| G4 | 22 | 29.90 | 1.20 | 1.85026 | 32.3 |
| | 23 | 17.90 | 5.15 | 1.58913 | 61.1 |
| | 24 | -70.56 | D | | |
| G5 | 25 | 83.78 | 3.00 | 1.92286 | 18.9 |
| | 26 | -20.28 | 1.00 | 1.76182 | 26.5 |
| | 27 | 10.52 | 5.40 | | |
| | 28 | 13.95 | 3.75 | 1.51633 | 64.1 |
| | 29 | -47.21 | 14.12 | | |

FIG.17A

EXAMPLE4

| | WIDE ANGLE END | INTERMEDIATE AREA | TELEPHOTO END |
|---|---|---|---|
| FOCAL DISTANCE (mm) | 10.30 | 75.00 | 232.58 |
| F NUMBER | 1.85 | 2.43 | 3.71 |
| HALF ANGLE OF VIEW(°) | 24.23 | 3.37 | 1.09 |
| A (mm) | 1.50 | 71.95 | 94.50 |
| B (mm) | 96.20 | 25.75 | 3.20 |
| C (mm) | 11.56 | 3.21 | 11.59 |
| D (mm) | 1.88 | 10.24 | 1.85 |
| TOTAL OPTICAL LENGTH (mm) | | | 206.67 |
| TELEPHOTO RATIO | | | 0.89 |

FIG.17B

EXAMPLE4

| | |
|---|---|
| f1/ft | 0.56 |
| f4/f2 | 2.09 |
| f3/f4 | 1.25 |
| βt4/βw4 | 1.24 |
| βt4 | 0.49 |
| n5A | 1.92286 |
| n5B | 1.76182 |

FIG.17C

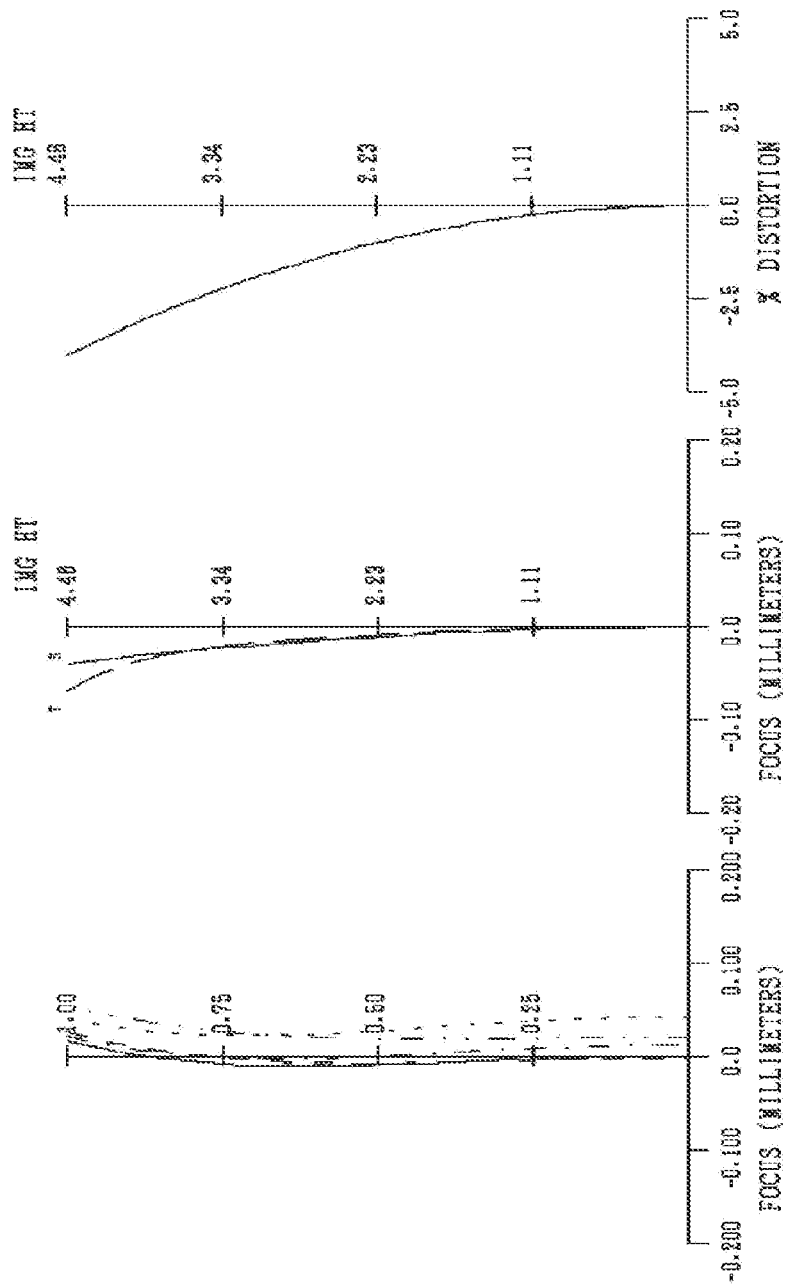

EXAMPLE4 WIDE ANGLE END
TANGENTIAL
ω = 24.23°

SAGITTAL

ω = 17.13°

656.2750 NM
587.5600 NM
546.0700 NM
486.1300 NM
435.8300 NM

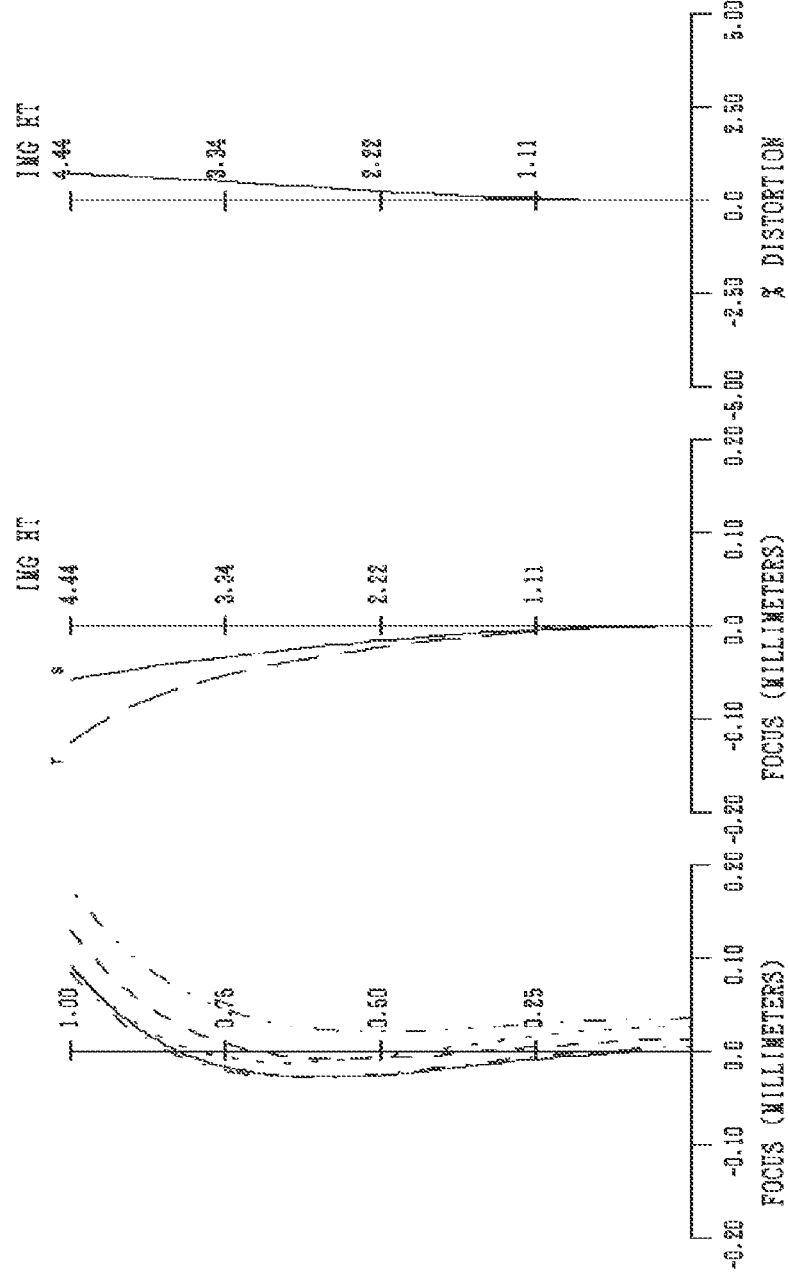

EXAMPLE4 INTERMEDIATE AREA

FIG.19D  ω=3.373° TANGENTIAL

FIG.19E  SAGITTAL

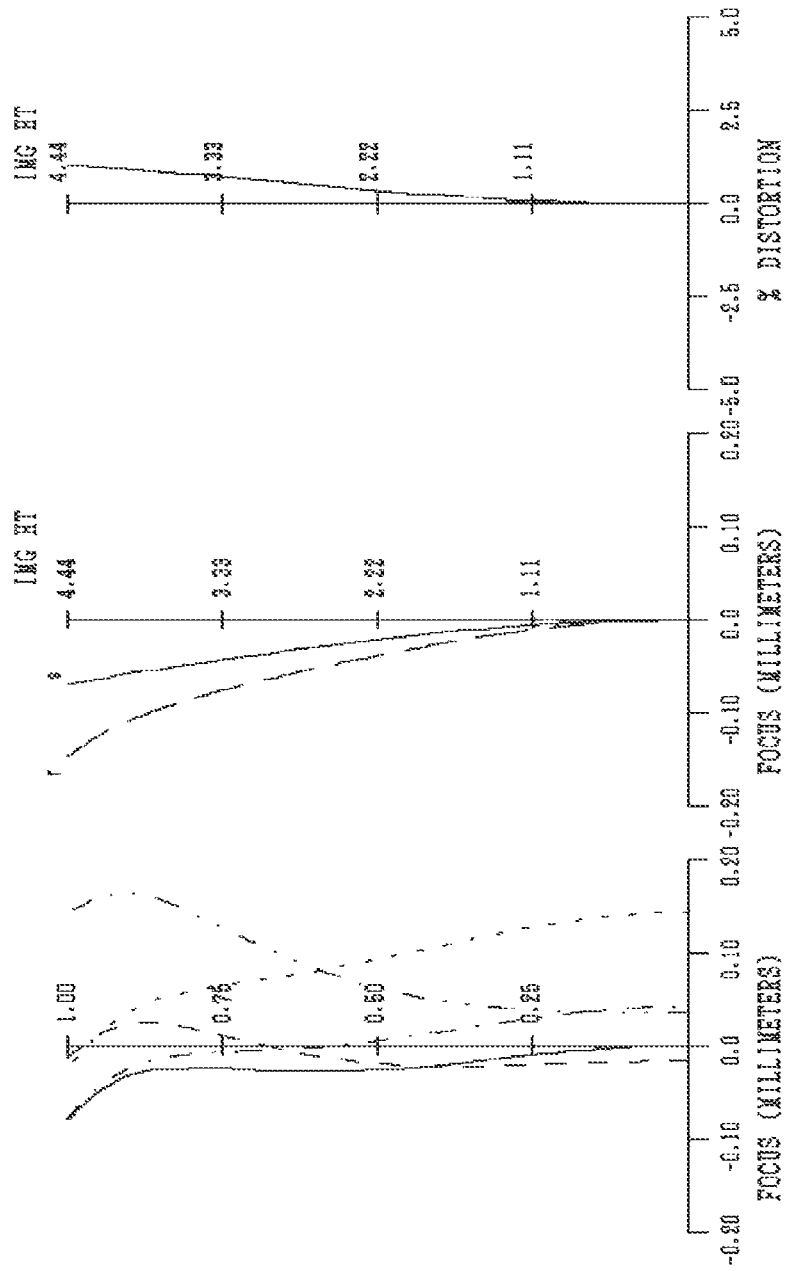

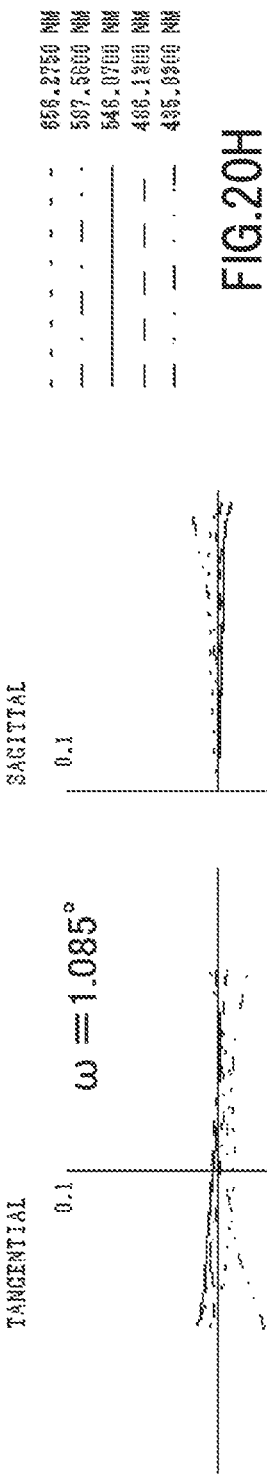

EXAMPLE5

| | SURFACE NUMBER Ni | r(mm) | d(mm) | nd | vd |
|---|---|---|---|---|---|
| G1 | 1 | 751.30 | 2.50 | 1.78800 | 47.4 |
| | 2 | 86.00 | 1.10 | | |
| | 3 | 86.00 | 9.50 | 1.43875 | 95.0 |
| | 4 | -439.50 | 0.25 | | |
| | 5 | 107.64 | 8.15 | 1.43875 | 95.0 |
| | 6 | -473.55 | 0.25 | | |
| | 7 | 88.67 | 7.05 | 1.49700 | 81.6 |
| | 8 | 640.00 | A | | |
| G2 | 9 | 539.20 | 1.50 | 1.80400 | 46.6 |
| | 10 | 17.36 | 5.48 | | |
| | 11 | -44.63 | 1.35 | 1.54633 | 64.1 |
| | 12 | 70.80 | 0.20 | | |
| | 13 | 29.70 | 3.30 | 1.92286 | 18.9 |
| | 14 | 68.00 | B | | |
| G3 | DIAPHRAGM | ∞ | 0.70 | | |
| | 15 | ∞ | 1.00 | 1.51633 | 64.1 |
| | 16 | ∞ | 1.60 | | |
| | 17 | 79.53 | 4.20 | 1.49700 | 81.6 |
| | 18 | -56.96 | 0.21 | | |
| | 19 | 36.88 | 5.70 | 1.49700 | 81.6 |
| | 20 | -36.88 | 1.30 | 1.83400 | 37.2 |
| | 21 | 36.88 | 1.01 | | |
| | 22 | 35.89 | 3.55 | 1.84666 | 23.8 |
| | 23 | 298.78 | C | | |
| G4 | 24 | 35.89 | 1.20 | 1.84666 | 23.8 |
| | 25 | 16.07 | 4.40 | 1.65844 | 50.9 |
| | 26 | 400.00 | 0.20 | | |
| | 27 | 47.49 | 2.70 | 1.88300 | 40.8 |
| | 28 | 334.60 | D | | |
| G5 | 29 | 418.60 | 2.95 | 1.95906 | 17.5 |
| | 30 | -15.80 | 1.10 | 1.80518 | 25.4 |
| | 31 | 10.04 | 4.78 | | |
| | 32 | 13.04 | 4.00 | 1.51633 | 64.1 |
| | 33 | -70.72 | 14.13 | | |

FIG.22A

EXAMPLE5

| | WIDE ANGLE END | INTERMEDIATE AREA | TELEPHOTO END |
|---|---|---|---|
| FOCAL DISTANCE(mm) | 10.30 | 75.00 | 232.58 |
| F NUMBER | 1.96 | 2.48 | 3.86 |
| HALF ANGLE OF VIEW(°) | 24.23 | 3.38 | 1.09 |
| A(mm) | 2.00 | 73.54 | 94.12 |
| B(mm) | 94.75 | 23.21 | 2.63 |
| C(mm) | 14.85 | 7.63 | 18.51 |
| D(mm) | 6.16 | 13.38 | 2.50 |
| TOTAL OPTICAL LENGTH(mm) | | | 213.12 |
| TELEPHOTO RATIO | | | 0.92 |

FIG.22B

EXAMPLE5

| | |
|---|---|
| f1/ft | 0.53 |
| f4/f2 | 1.80 |
| f3/f4 | 1.38 |
| βt4/βw4 | 1.25 |
| βt4 | 0.47 |
| n5A | 1.95906 |
| n5B | 1.80518 |

FIG.22C

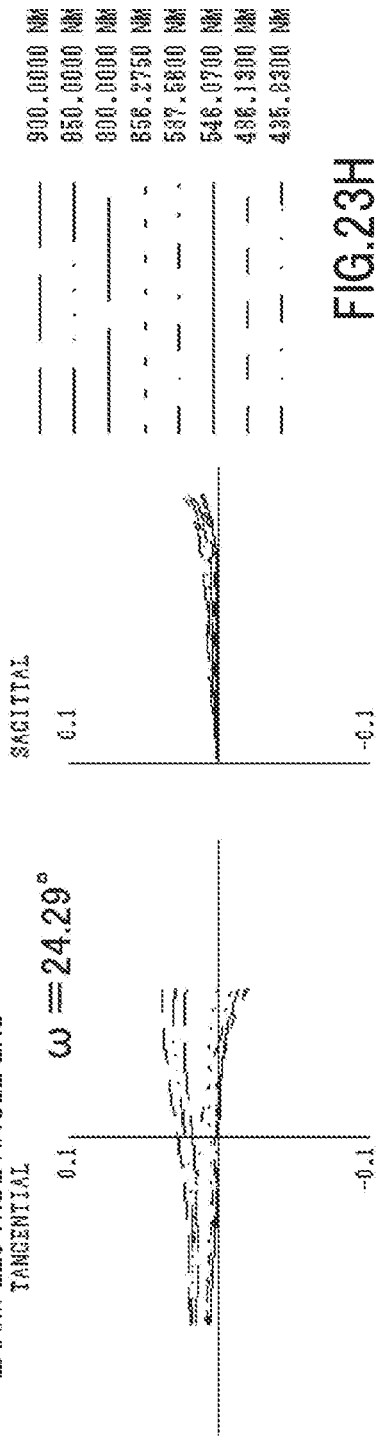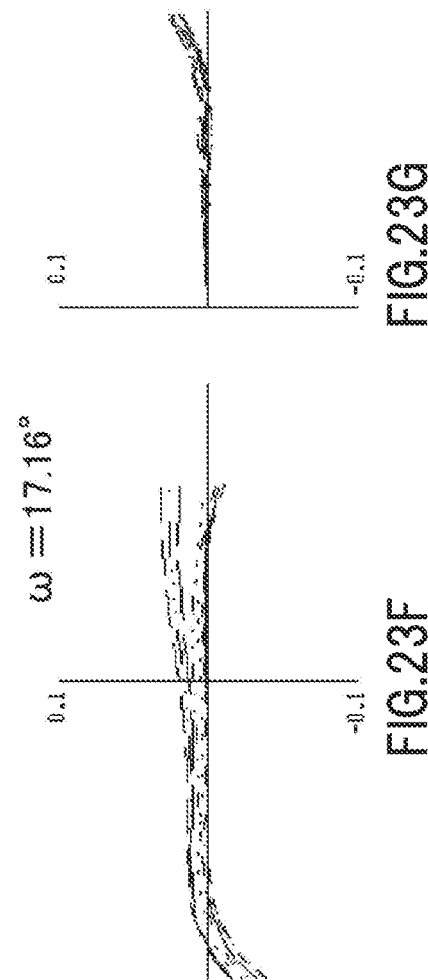

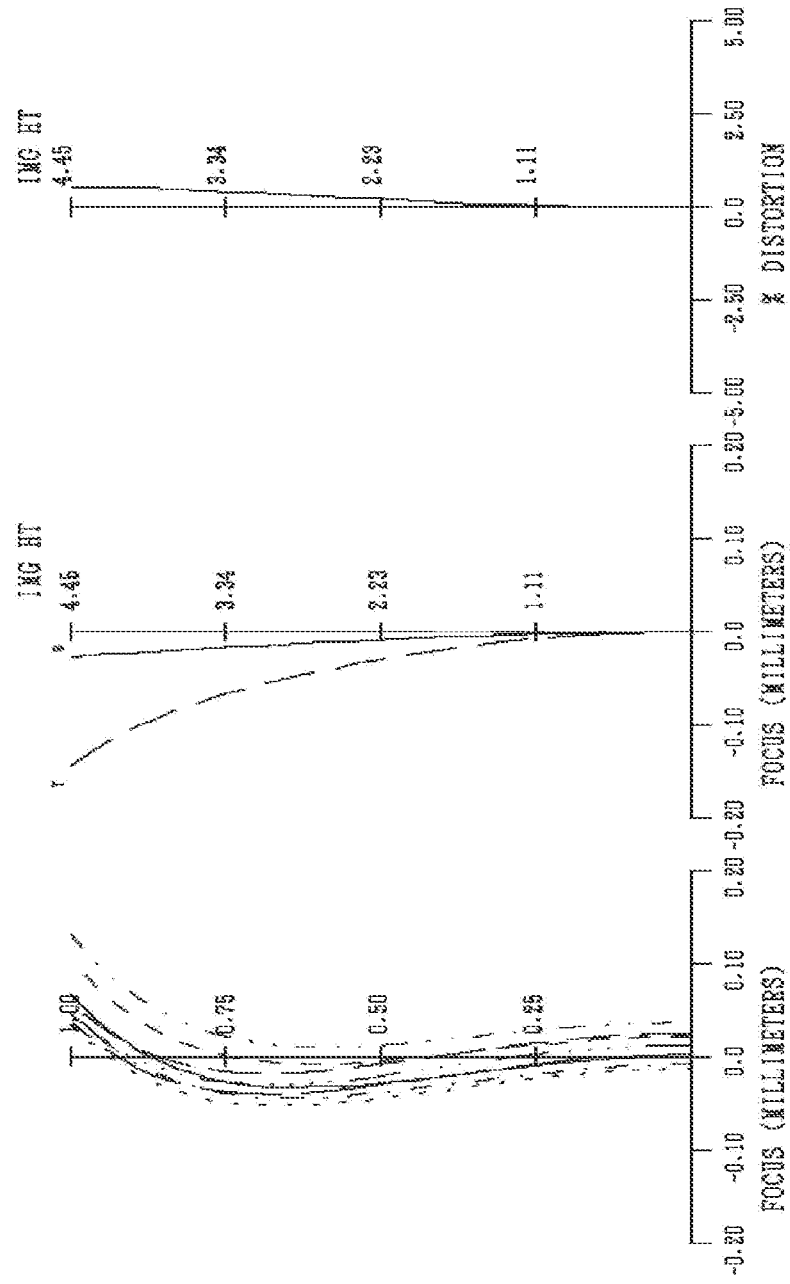

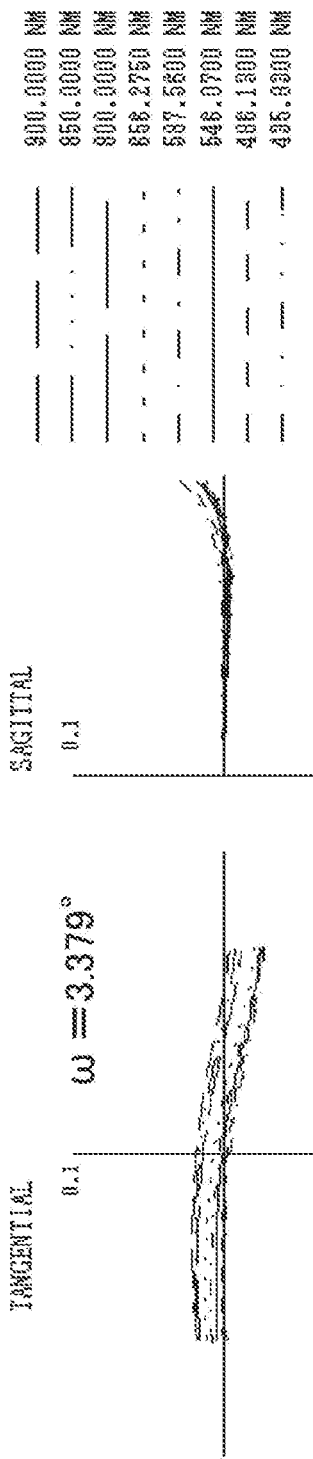

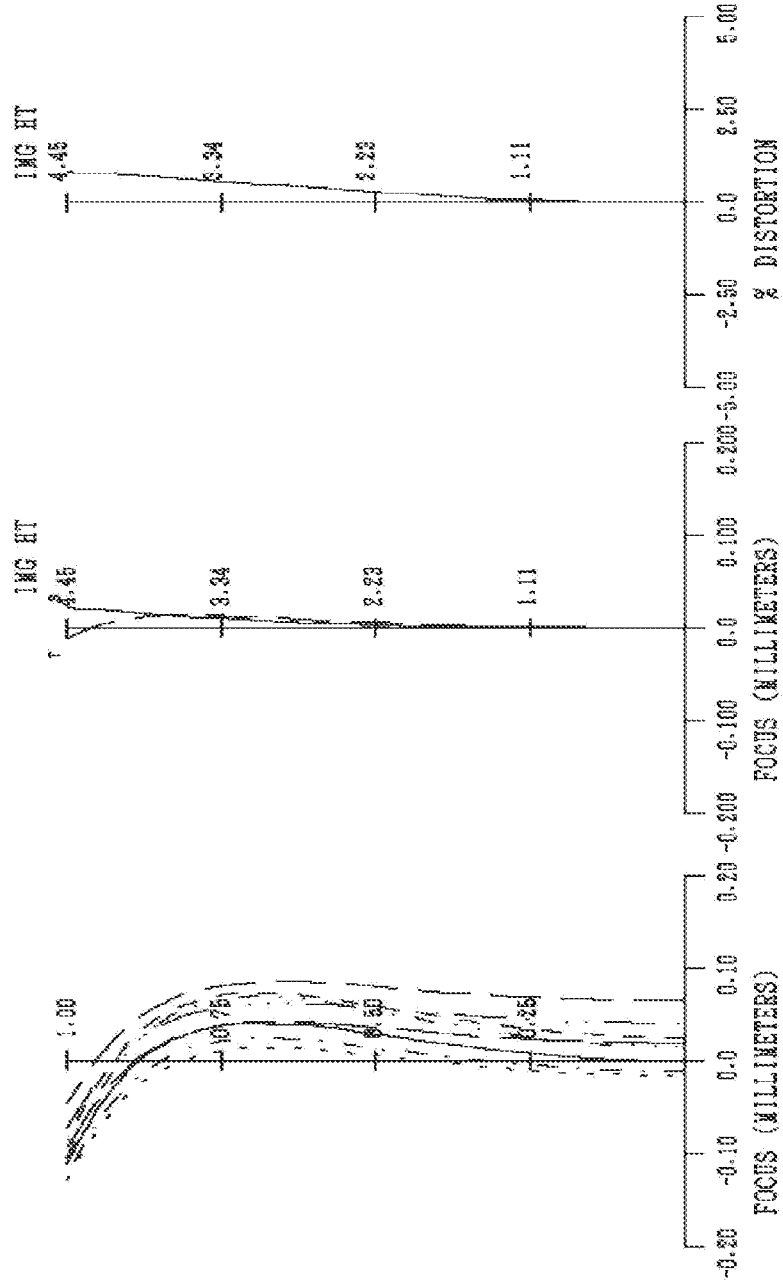

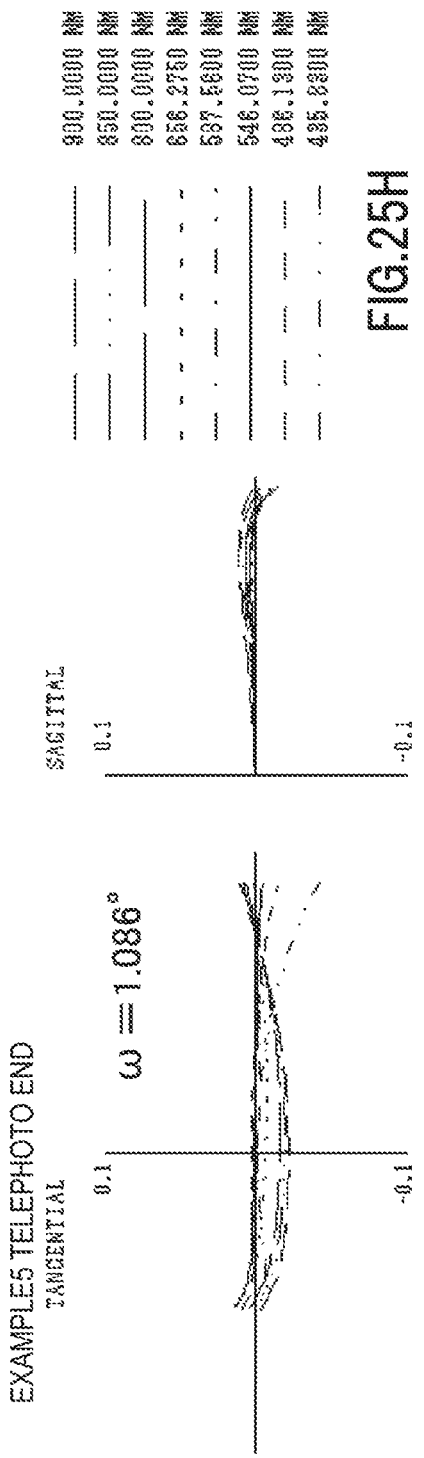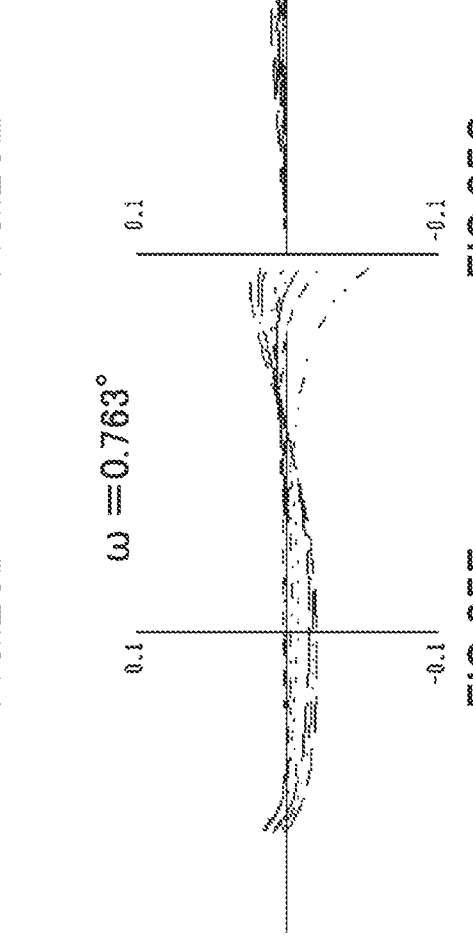

ZOOM LENS HAVING FIRST THROUGH FIFTH LENS GROUPS AND A SPECIFIC FOCAL DISTANCE RATIO AMONG THE LENS GROUPS

CROSS-REFERENCE TO RELATED APPLICATIONS

This Application is a U.S. National Phase Application under 35 U.S.C. 371 of International Application No. PCT/JP2013/065495, filed Jun. 4, 2013 and published in Japanese as WO 2014/196022 A1 on Dec. 11, 2014. The entire disclosure of the above application is incorporated herein by reference.

BACKGROUND

Technical Field

The present invention relates to a zoom lens.

Description of Related Art

A zoom lens consisting of a plurality of lens groups as a high power zoom, is known. Japanese Patent Laid Open Publication No. 2008-241884 or Japanese Patent Laid Open Publication No. 2006-39005 discloses a zoom lens consisting of a first lens group having a positive refractive power, a second lens group having a negative refractive power, a third lens group having a positive or negative refractive power, and a fourth lens group having a positive refractive power and a diaphragm.

In recent years, with a miniaturization of a pixel size of an imaging device, it is required to provide a zoom lens capable of suppressing a variation of aberration throughout an entire zoom range and maintaining a high resolution. Further, since sizes of a housing for housing a lens and a camera platform are restricted, it is also required to miniaturize the zoom lens. However, when a total optical length of the zoom lens is set to be short, the power of each lens group becomes large, thus possibly making it difficult to correct the aberration. Thus, it would be difficult to achieve both of obtaining a high optical performance in the entire zoom range at a high zoom ratio, and shortening the total optical length of the zoom lens.

An object of the present invention is to provide a zoom lens capable of achieving both of obtaining a high optical performance in the entire zoom range at a high zoom ratio, and shortening the total optical length of the zoom lens.

SUMMARY OF THE INVENTION

According to an aspect of the present invention, there is provided a zoom lens, consisting of sequentially from an object side:

a first lens group having a positive refractive power and a focusing function;

a second lens group having a negative refractive power and having a variator function of performing zooming;

a third lens group having a positive refractive power and a diaphragm;

a fourth lens group having a positive refractive power, and having a compensator function of correcting a position of an imaging plane at the time of zooming; and a fifth lens group having a positive or negative refractive power, wherein the second lens group is moved to the imaging plane side from the object side along an optical axis, and the fourth lens group is moved along the optical axis, in a state of fixing the first lens group, the third lens group, and the fifth lens group at the time of zooming from a wide angle end to a telephoto end, and only the first lens group is moved along the optical axis at the time of focusing.

According to a second aspect of the present invention, there is provided the zoom lens of the first aspect, wherein the first lens group is composed of three or more lenses including at least one concave lens, and the following conditional formula (1) is satisfied:

$$0.45 < f1/ft < 0.6 \quad (1)$$

wherein f1: focal distance of the first lens group ft: focal distance of a total lens system at the telephoto end.

According to a third aspect of the present invention, there is provided the zoom lens of the first aspect, wherein the fourth lens group includes at least two lenses, and the following conditional formulas (2) to (5) are satisfied:

$$1 < f4/|f2| < 2.5 \quad (2)$$

$$0.83 < f3/f4 < 3 \quad (3)$$

$$0.5 < \beta t4/\beta w4 < 1.7 \quad (4)$$

$$\beta t4 < 0.6 \quad (5)$$

wherein f2: focal distance of the second lens group f3: focal distance of the third lens group f4: focal distance of the fourth lens group βw4: lateral magnification of the fourth lens at the wide angle end βt4: lateral magnification of the fourth lens at the telephoto end.

According to the fourth aspect of the present invention, there is provided the zoom lens of the first aspect, wherein the fifth lens group includes at least three lenses, and the object side two lenses of at least the three lenses of the fifth lens group are configured as a cemented lens composed of a positive lens and a negative lens sequentially from the object side, and the following formula (6) is satisfied:

$$n5B < n5A \quad (6)$$

wherein n5A: d line refractive index of the positive lens included in the cemented lens of the fifth lens group n5B: d line refractive index of the negative lens included in the cemented lens of the fifth lens group.

According to a fifth aspect of the present invention, there is provided the zoom lens of the first aspect, wherein the fourth lens group includes at least two lenses, and the fifth lens group includes at least three lenses, and the object side two lenses of at least the three lenses of the fifth lens group are configured as a cemented lens composed of a positive lens and a negative lens sequentially from the object side, and the above conditional formulas (2) to (6) are satisfied.

According to a sixth aspect of the present invention, there is provided the zoom lens of the first aspect, wherein the first lens group is composed of three or more lenses including at least one concave lens, and the fourth lens group includes at least two lenses, and the fifth lens group includes at least three lenses, and the object side two lenses of at least the three lenses of the fifth lens group are configured as a cemented lens composed of a positive lens and a negative lens sequentially from the object side, and the above conditional formulas (1) to (6) are satisfied.

According to the present invention, there is provided a zoom lens capable of achieving both of obtaining a high optical performance in the entire zoom range at a high zoom ratio, and shortening the total optical length of the zoom lens.

BRIEF DESCRIPTION OF THE DRAWINGS

FIG. 2A is a view showing parameters of each lens group of the zoom lens of example 1, FIG. 2B is a view showing each parameter at a wide angle end, in an intermediate area, and at a telephoto end of the zoom lens of example 1, and FIG. 2C is a view showing values of each conditional formula of the zoom lens of example 1.

FIG. 3A to FIG. 3C are longitudinal aberration diagrams at the wide angle end of the zoom lens of example 1, wherein FIG. 3A is a spherical aberration diagram, FIG. 3B is an astigmatism diagram and astigmatic field curves diagram, FIG. 3C is a distortion aberration diagram, and FIG. 3D to FIG. 3G are lateral aberration diagrams at the wide angle end of the zoom lens of example 1, FIG. 3D is a lateral aberration diagram in a meridional direction at a half angle of view of 24.19°, FIG. 3E is a lateral aberration diagram in a sagittal direction at a half angle of view of 24.19°, FIG. 3F is a lateral aberration diagram in the meridional direction at a half angle of view of 17.13°, FIG. 3G is a lateral aberration diagram in the sagittal direction at a half angle of view of 17.13°, FIG. 3H is a spherical aberration diagram of FIG. 3A, and is a view showing a line type for a wavelength of a light in the lateral aberration diagrams of FIG. 3D to FIG. 3G.

FIG. 4A to FIG. 4C are longitudinal aberration diagrams in an intermediate area of the zoom lens of example 1, wherein FIG. 4A is a spherical aberration diagram, FIG. 4B is an astigmatism diagram and astigmatic field curves diagram, FIG. 4C is a distortion aberration diagram, FIG. 4D to FIG. 4G are lateral aberration diagrams in the intermediate area of the zoom lens of example 1, FIG. 4D is a lateral aberration diagram in the meridional direction at a half angle of view of 3.312°, FIG. 4E is a lateral aberration diagram in the sagittal direction at a half angle of view of 3.312°, FIG. 4F is a lateral aberration diagram in the meridional direction at a half angle of view of 2.350°, FIG. 4G is a lateral aberration diagram in the sagittal direction at a half angle of view of 2.350°, FIG. 4H is a spherical aberration diagram of FIG. 4A, and is a view showing the line type for the wavelength of a light in the lateral aberration diagrams of FIG. 4D to FIG. 4G.

FIG. 5A to FIG. 5C are longitudinal aberration diagrams at the telephoto end of the zoom lens of example 1, wherein FIG. 5A is a spherical aberration diagram, FIG. 5B is an astigmatism diagram and astigmatic field curves diagram, FIG. 5C is a distortion aberration diagram, FIG. 5D to FIG. 5G are lateral aberration diagrams at the telephoto end of the zoom lens of example 1, FIG. 5D is a lateral aberration diagram in the meridional direction at a half angle of view of 0.824°, FIG. 5E is a lateral aberration diagram in the sagittal direction at a half angle of view of 0.824°, FIG. 5F is a lateral aberration diagram in the meridional direction at a half angle of view of 0.585°, FIG. 5G is a lateral aberration diagram in the sagittal direction at a half angle of view of 0.585°, FIG. 5H is a spherical aberration diagram of FIG. 5A, and is a view showing the line type for the wavelength of a light in the lateral aberration diagrams of FIG. 5D to FIG. 5G.

FIG. 7A is a view showing parameters of each lens group of the zoom lens of example 2, FIG. 7B is a view showing each parameter at the wide angle end, in the intermediate area, and at the telephoto end of the zoom lens of example 2, and FIG. 7C is a view showing the values of each conditional formula of the zoom lens of example 2.

FIG. 8A to FIG. 8C are longitudinal aberration diagrams at the wide angle end of the zoom lens of example 2, wherein FIG. 8A is a spherical aberration diagram, FIG. 8B is an astigmatism diagram and astigmatic field curves diagram, FIG. 8C is a distortion aberration diagram, FIG. 8D to FIG. 8G are lateral aberration diagrams at the wide angle end of the zoom lens of example 2, FIG. 8D is a lateral aberration diagram in the meridional direction at a half angle of view of 24.55°, FIG. 8E is a lateral aberration diagram in the sagittal direction at a half angle of view of 24.55°, FIG. 8F is a lateral aberration diagram in the meridional direction at a half angle of view of 17.26°, FIG. 8G is a lateral aberration diagram in the sagittal direction at a half angle of view of 17.26°, FIG. 8H is a spherical aberration diagram of FIG. 8A, and is a view showing the line type for the wavelength of a light in the lateral aberration diagrams of FIG. 8D to FIG. 8G.

FIG. 9A to FIG. 9C are longitudinal aberration diagrams in the intermediate area of the zoom lens of example 2, wherein FIG. 9A is a spherical aberration diagram, FIG. 9B is an astigmatism diagram and astigmatic field curves diagram, FIG. 9C is a distortion aberration diagram, FIG. 9D to FIG. 9G are lateral aberration diagrams in the intermediate area of the zoom lens of example 2, FIG. 9D is a lateral aberration diagram in the meridional direction at a half angle of view of 3.322°, FIG. 9E is a lateral aberration diagram in the sagittal direction at a half angle of view of 3.322°, FIG. 9F is a lateral aberration diagram in the meridional direction at a half angle of view of 2.353°, FIG. 9G is a lateral aberration diagram in the sagittal direction at a half angle of view of 2.353°, FIG. 9H is a spherical aberration diagram of FIG. 9A, and is a view showing the line type for the wavelength of a light in the lateral aberration diagrams of FIG. 9D to FIG. 9G.

FIG. 10A to FIG. 10C are longitudinal aberration diagrams at the telephoto end of the zoom lens of example 2, wherein FIG. 10A is a spherical aberration diagram, FIG. 10B is an astigmatism diagram and astigmatic field curves diagram, FIG. 10C is a distortion aberration diagram, FIG. 10D to FIG. 10G are lateral aberration diagrams in the telephoto end of the zoom lens of example 2, FIG. 10D is a lateral aberration diagram in the meridional direction at a half angle of view of 1.297°, FIG. 10E is a lateral aberration diagram in the sagittal direction at a half angle of view of 1.297°, FIG. 10F is a lateral aberration diagram in the meridional direction at a half angle of view of 0.922°, FIG. 10G is a lateral aberration diagram in the sagittal direction at a half angle of view of 0.922°, FIG. 10H is a spherical aberration diagram of FIG. 10A, and is a view showing the line type for the wavelength of a light in the lateral aberration diagrams of FIG. 10D to FIG. 10G.

FIG. 12A is a view showing parameters of each lens group of the zoom lens of example 3, FIG. 12B is a view showing each parameter at a wide angle end, in an intermediate area, and at a telephoto end of the zoom lens of example 3, and FIG. 12C is a view showing values of each conditional formula of the zoom lens of example 3.

FIG. 13A to FIG. 13C are longitudinal aberration diagrams at the wide angle end of the zoom lens of example 3, wherein FIG. 13A is a spherical aberration diagram, FIG. 13B is an astigmatism diagram and astigmatic field curves diagram, FIG. 13C is a distortion aberration diagram, and FIG. 13D to FIG. 13G are lateral aberration diagrams at the wide angle end of the zoom lens of example 3, FIG. 13D is a lateral aberration diagram in a meridional direction at a half angle of view of 24.57°, FIG. 13E is a lateral aberration diagram in a sagittal direction at a half angle of view of 24.57°, FIG. 13F is a lateral aberration diagram in the meridional direction at a half angle of view of 17.26°, FIG. 13G is a lateral aberration diagram in the sagittal direction at a half angle of view of 17.26°, FIG. 13H is a spherical aberration diagram of FIG. 13A, and is a view showing a line type for a wavelength of a light in the lateral aberration diagram of FIG. 13D to FIG. 13G.

FIG. 14A to FIG. 14C are longitudinal aberration diagrams in an intermediate area of the zoom lens of example 3, wherein FIG. 14A is a spherical aberration diagram, FIG. 14B is an astigmatism diagram and astigmatic field curves diagram, FIG. 14C is a distortion aberration diagram, FIG. 14D to FIG. 14G are lateral aberration diagrams in the intermediate area of the zoom lens of example 3, FIG. 14D is a lateral aberration diagram in the meridional direction at a half angle of view of 3.338°, FIG. 4E is a lateral aberration diagram in the sagittal direction at a half angle of view of 3.338°, FIG. 14F is a lateral aberration diagram in the meridional direction at a half angle of view of 2.359°, FIG. 14G is a lateral aberration diagram in the sagittal direction at a half angle of view of 2.359°, FIG. 14H is a spherical aberration diagram of FIG. 14A, and is a view showing the line type for the wavelength of a light in the lateral aberration diagram of FIG. 14D to FIG. 14G.

FIG. 15A to FIG. 15C are longitudinal aberration diagrams at the telephoto end of the zoom lens of example 3, wherein FIG. 15A is a spherical aberration diagram, FIG. 15B is an astigmatism diagram and astigmatic field curves diagram, FIG. 15C is a distortion aberration diagram, FIG. 15D to FIG. 15G are lateral aberration diagrams at the telephoto end of the zoom lens of example 3, FIG. 15D is a lateral aberration diagram in the meridional direction at a half angle of view of 1.072°, FIG. 15E is a lateral aberration diagram in the sagittal direction at a half angle of view of 1.072°, FIG. 15F is a lateral aberration diagram in the meridional direction at a half angle of view of 0.759°, FIG. 15G is a lateral aberration diagram in the sagittal direction at a half angle of view of 0.759°, FIG. 15H is a spherical aberration diagram of FIG. 15A, and is a view showing the line type for the wavelength of a light in the lateral aberration diagrams of FIG. 15D to FIG. 15G.

FIG. 17A is a view showing parameters of each lens group of the zoom lens of example 4, FIG. 17B is a view showing each parameter at the wide angle end, in the intermediate area, and at the telephoto end of the zoom lens of example 4, and FIG. 17C is a view showing the values of each conditional formula of the zoom lens of example 4.

FIG. 18A to FIG. 18C are longitudinal aberration diagrams at the wide angle end of the zoom lens of example 4, wherein FIG. 18A is a spherical aberration diagram, FIG. 18B is an astigmatism diagram and astigmatic field curves diagram, FIG. 18C is a distortion aberration diagram, FIG. 185D is a lateral aberration diagram in the meridional direction at a half angle of view of 24.23°, FIG. 18E is a lateral aberration diagram in the sagittal direction at a half angle of view of 24.23°, FIG. 18F is a lateral aberration diagram in the meridional direction at a half angle of view of 17.13°, FIG. 18G is a lateral aberration diagram in the sagittal direction at a half angle of view of 17.13°.

Figures 19D, 19E, 19F, 19G, 19H:
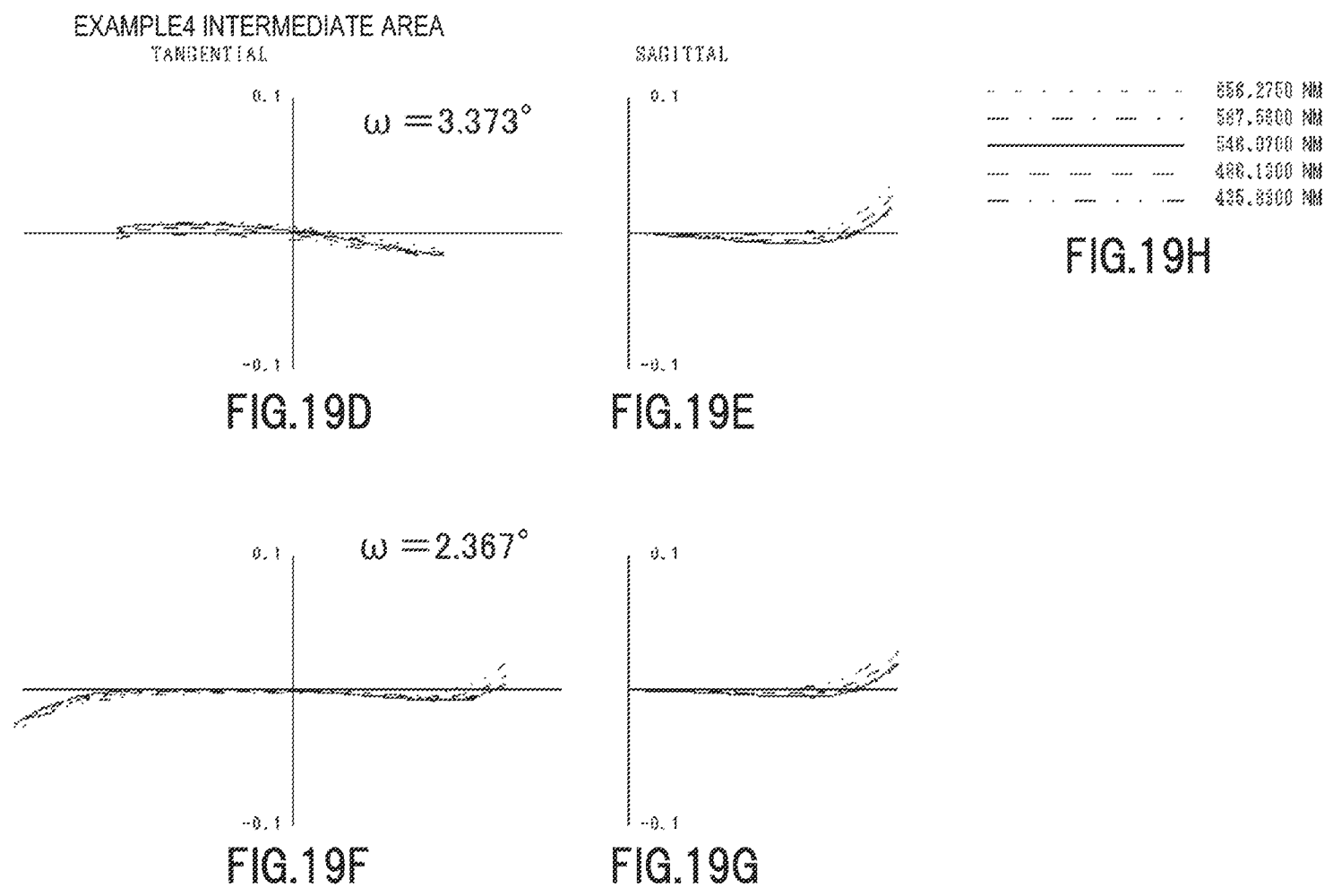

FIG. 19A to FIG. 19C are longitudinal aberration diagrams in the intermediate area of the zoom lens of example 4, wherein FIG. 19A is a spherical aberration diagram, FIG. 19B is an astigmatism diagram and astigmatic field curves diagram, FIG. 19C is a distortion aberration diagram, FIG. 19D to FIG. 19G are lateral aberration diagrams in the intermediate area of the zoom lens of example 4, FIG. 19D is a lateral aberration diagram in the meridional direction at a half angle of view of 3.373°, FIG. 19E is a lateral aberration diagram in the sagittal direction at a half angle of view of 3.373°, FIG. 19F is a lateral aberration diagram in the meridional direction at a half angle of view of 2.367°, FIG. 19G is a lateral aberration diagram in the sagittal direction at a half angle of view of 2.367°, FIG. 19H is a spherical aberration diagram of FIG. 19A, and is a view showing the line type for the wavelength of a light in the lateral aberration diagrams of FIG. 19D to FIG. 19G.

FIG. 20A to FIG. 20C are longitudinal aberration diagrams at the telephoto end of the zoom lens of example 4, wherein FIG. 20A is a spherical aberration diagram, FIG. 20B is an astigmatism diagram and astigmatic field curves diagram, FIG. 20C is a distortion aberration diagram, FIG. 20D to FIG. 20G are lateral aberration diagrams at the telephoto end of the zoom lens of example 4, FIG. 20D is a lateral aberration diagram in the meridional direction at a half angle of view of 1.085°, FIG. 20E is a lateral aberration diagram in the sagittal direction at a half angle of view of 1.085°, FIG. 20F is a lateral aberration diagram in the meridional direction at a half angle of view of 0.762°, FIG. 20G is a lateral aberration diagram in the sagittal direction at a half angle of view of 0.762°, FIG. 20H is a spherical aberration diagram of FIG. 20A, and is a view showing the line type for the wavelength of a light in the lateral aberration diagrams of FIG. 20D to FIG. 20G.

FIG. 22A is a view showing parameters of each lens group of the zoom lens of example 5, FIG. 22B is a view showing each parameter at the wide angle end, in the intermediate area, and at the telephoto end of the zoom lens of example 5, and FIG. 22C is a view showing a value of each conditional formula of the zoom lens of example 5.

FIG. 23A to FIG. 23C are longitudinal aberration diagrams at the wide angle end of the zoom lens of example 5, wherein FIG. 23A is a spherical aberration diagram, FIG. 23B is an astigmatism diagram and astigmatic field curves diagram, FIG. 23C is a distortion aberration diagram, and FIG. 23D to FIG. 23G are lateral aberration diagram at the wide angle end of the zoom lens of example 5, FIG. 23D is a lateral aberration diagram in a meridional direction at a half angle of view of 24.23°, FIG. 23E is a lateral aberration diagram in a sagittal direction at a half angle of view of 24.23°, FIG. 23F is a lateral aberration diagram in the meridional direction at a half angle of view of 17.16°, FIG.

23G is a lateral aberration diagram in the sagittal direction at a half angle of view of 17.16°, FIG. 23H is a spherical aberration diagram of FIG. 23A, and is a view showing a line type for a wavelength of a light in the lateral aberration diagram of FIG. 23D to FIG. 23G.

FIG. 24A to FIG. 24C are longitudinal aberration diagrams in an intermediate area of the zoom lens of example 5, wherein FIG. 24A is a spherical aberration diagram, FIG. 24B is an astigmatism diagram and astigmatic field curves diagram, FIG. 24C is a distortion aberration diagram, FIG. 24D to FIG. 24G are lateral aberration diagram in the intermediate area of the zoom lens of example 5, FIG. 24D is a lateral aberration diagram in the meridional direction at a half angle of view of 3.379°, FIG. 24E is a lateral aberration diagram in the sagittal direction at a half angle of view of 3.379°, FIG. 24F is a lateral aberration diagram in the meridional direction at a half angle of view of 2.369°, FIG. 24G is a lateral aberration diagram in the sagittal direction at a half angle of view of 2.369°, FIG. 24H is a spherical aberration diagram of FIG. 24A, and is a view showing the line type for the wavelength of a light in the lateral aberration diagrams of FIG. 24D to FIG. 24G.

FIG. 25A to FIG. 25C are longitudinal aberration diagrams at the telephoto end of the zoom lens of example 5, wherein FIG. 25A is a spherical aberration diagram, FIG. 25B is an astigmatism diagram and astigmatic field curves diagram, FIG. 25C is a distortion aberration diagram, FIG. 25D to FIG. 25G are lateral aberration diagrams at the telephoto end of the zoom lens of example 5, FIG. 25D is a lateral aberration diagram in the meridional direction at a half angle 1.086°, FIG. 25E is a lateral aberration diagram in the sagittal direction at a half angle of view of 1.086°, FIG. 25F is a lateral aberration diagram in the meridional direction at a half angle of view of 0.763°, FIG. 25G is a lateral aberration diagram in the sagittal direction at a half angle of view of 0.763°, FIG. 25H is a spherical aberration diagram of FIG. 25A, and is a view showing the line type for the wavelength of a light in the lateral aberration diagrams of FIG. 25D to FIG. 25G.

DETAILED DESCRIPTION OF THE INVENTION

Embodiments of the present invention will be described hereafter, with reference to the drawings.

An Embodiment of the Present Invention

(1) Configuration of a Zoom Lens

Figure 1:
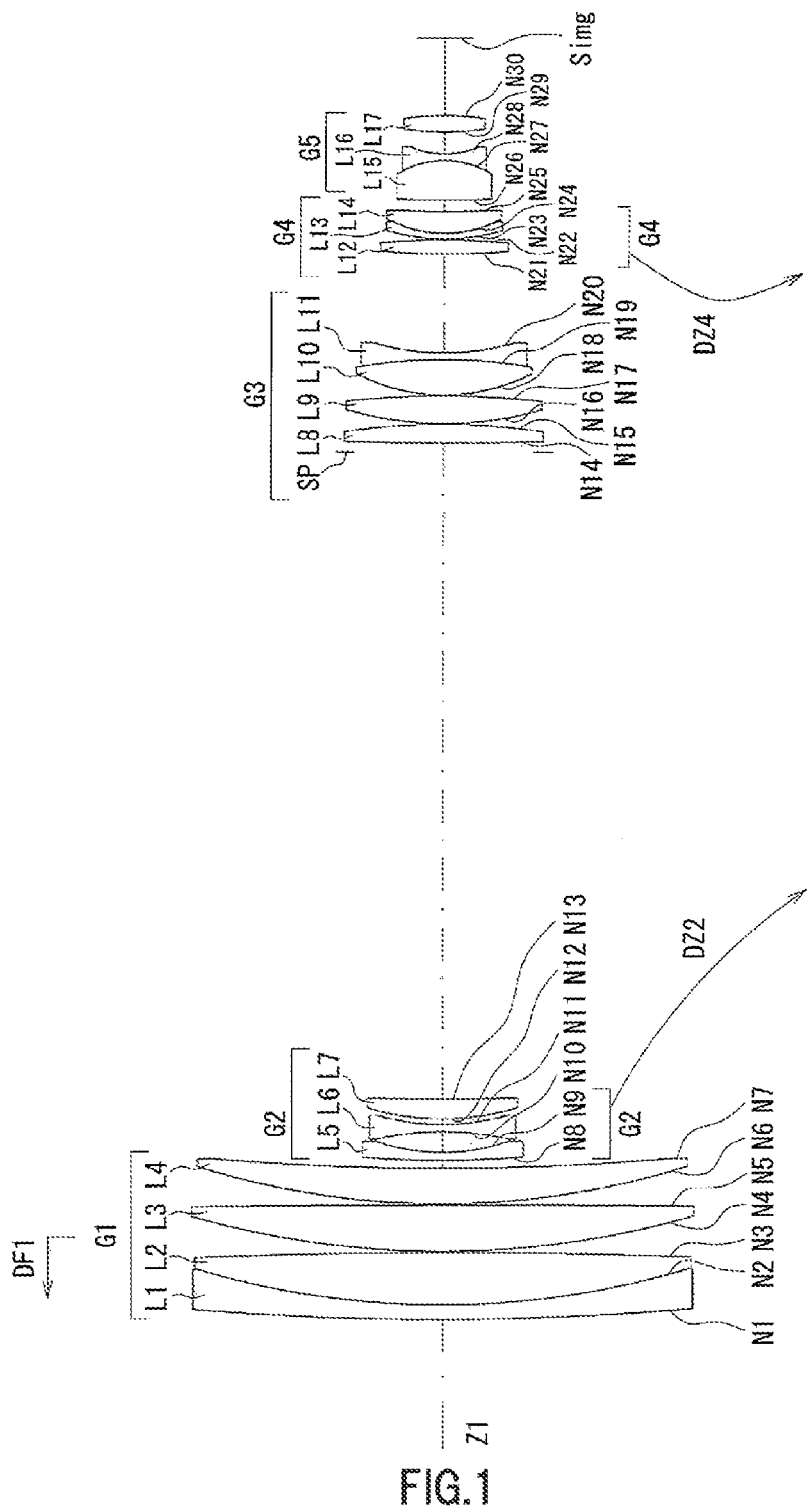
FIG. 1 is a cross-sectional view showing a configuration of a zoom lens at a wide angle end according to an example 1 of an embodiment of the present invention.

A zoom lens of an embodiment of the present invention will be described, using FIG. 1. FIG. 1 is a cross-sectional view at a wide angle end of the zoom lens of this embodiment. Ni indicates the surface number of each lens (i is a natural number). Here, explanation is given for example 1 described later, as a typical example of this embodiment.

The zoom lens of this embodiment is configured to perform zooming while maintaining a total optical length. The "total optical length" means a distance from surface N1 to imaging plane Simg of a lens system.

The zoom lens of this embodiment consists of sequentially from an object (object to be photographed) side, a first lens group G1 having a positive refractive power and a focusing function, a second group G2 having a negative refractive power and a variator function of performing zooming, a third lens group G3 having a positive refractive power and including a diaphragm, a fourth lens group G4 having a positive refractive power and having a compensator function of correcting a position of an imaging plane at the time of zooming, and a fifth lens group G5 having a positive or negative refractive power, wherein the second lens group G2 is moved to the imaging plane side from the object side along an optical axis Z1, and the fourth lens group G4 is moved along the optical axis Z1 in a state of fixing the first lens group G1, the third lens group G3, and the fifth lens group G5 at the time of zooming from a wide angle end to a telephoto end, and only the first lens group G1 is moved along the optical axis Z1 at the time of focusing. Details are described hereafter.

As shown in FIG. 1, the zoom lens is composed of five lens groups, including the first lens group G1, the second lens group G2, the third lens group G3, the fourth lens group G4, and the fifth lens group G5, sequentially from the object side.

The first lens group G1 has a positive refractive power (optical power), and is composed of three or more lenses including at least one concave lens (negative lens) for example. Specifically, the first lens group G1 consists of a cemented lens (laminated lens) composed of an object side convex negative meniscus lens L1 and a double-sided convex positive lens L2, and a double-sided convex positive lens L3, and an object side convex positive meniscus lens L4, sequentially from the object side.

The first lens group G1 has a focusing function. The "focusing function" called here, is the function of focusing an object (act of bringing into focus) by movement of the lens group along the optical axis Z1. The lens group having the focusing function is also called a "focusing lens group". In this embodiment, only the first lens group G1 is the focusing lens group.

The second lens group G2 has a negative refractive power. Specifically, the second lens group G2 consists of an object side convex negative meniscus lens L5, a double-sided concave negative lens L6, and an object side convex positive meniscus lens L7, sequentially from the object side.

Further, the second lens group G2 has a variator function. The "variator function" called here, is the function of performing zooming by movement of the lens group along the optical axis Z1. The lens group having the variator function is also called a "variator lens group".

The third lens group G3 has a positive refractive power, and includes a diaphragm (iris) SP. Specifically, the third lens group G3 consists of a diaphragm SP, a double-sided convex positive lens L8, a double-sided convex positive lens L9, and a cemented lens composed of a double-sided convex positive lens L10 and a double-sided concave negative lens L11, sequentially from the object side.

The fourth lens group G4 has a positive refractive power, and includes at least two lenses for example. Specifically, the fourth lens group G4 consists of a double-sided convex positive lens L12, and a cemented lens composed of an object side convex negative meniscus lens L13 and an object side convex positive meniscus lens L14, sequentially from the object side.

Also, the fourth lens group G4 has a compensator function. The "compensator function" called here is the function of correcting a position of an imaging plane by movement of the lens group along the optical axis Z1 in conjunction with a variator lens group at the time of zooming. The lens group having the compensator function is also called a "compensator lens group". On the other hand, the fourth lens group G4 does not have the focusing function. Namely, the fourth lens group G4 is fixed at the time of focusing.

The fifth lens group G5 has a positive or negative refractive power, and includes at least three lenses. Further, the object side two lenses of at least the three lenses, are configured as a cemented lens composed of a positive lens and a negative lens sequentially from the object side. Specifically, the fifth lens group G5 includes a cemented lens composed of a double-sided convex positive lens L15 and a double-sided concave negative lens L16, and a double-sided convex positive lens L17, sequentially from the object side.

A relay system that forms an image on the imaging plane Simg is constituted mainly by the third lens group G3, the fourth lens group G4, and the fifth lens group G5.

A solid-state imaging device such as CCD (Charge Coupled Device) or a CMOS (Complementary Metal Oxide Semiconductor) is disposed at the position of the imaging plane Simg at the opposite side to the object side in the optical axis Z1 direction.

In this embodiment, the second lens group G2 as the variator lens group is moved to the imaging plane Simg side from the object side along the optical axis Z1 in a state of fixing the first lens group G1, the third lens group G3, and the fifth lens group G5, and the fourth lens group G4 as the compensator lens group is moved along the optical axis Z1 to follow the second lens group G2, at the time of zooming from the wide angle end to the telephoto end. Thus, zooming of the zoom lens can be easily performed while maintaining the total optical length.

Further, the second lens group G2 is monotonically moved to the imaging plane Simg side from the object side along the optical axis Z1, in a direction of DZ2 shown by arrow for example, at the time of zooming from the wide angle end to the telephoto end. On the other hand, the fourth lens group G4 is moved to the imaging plane Simg side after moving to the object side along the optical axis Z1, in a direction of DZ4 shown by arrow. In other words, the fourth lens group G4 is moved so as to draw a convex locus on the object side. Thus, a moving range of the fourth lens group G4 can be narrowed in the optical axis Z1 direction, and the total optical length can be shortened.

Further, in this embodiment, only the first lens group G1 as the focusing lens group, is moved along the optical axis Z1 in the direction of DF1 shown by arrow, when focusing is performed from an infinity object to a close distance object, at the time of focusing (act of bringing into focus). On the other hand, the second lens group G2, the third lens group G3, the fourth lens group 4, and the fifth lens group G5 are fixed. Thus, a moving amount of the focusing lens group is constant even if the zooming is performed, and the focusing can be stably performed. The "moving amount" means a moving distance for moving the lens back and forth, for focusing.

The zoom lens of this embodiment is used for a monitoring camera, etc. for example. The zoom lens having a high zoom ratio and a large solid-state imaging device which realizes a high resolution, are used for the monitoring camera that monitors traffic roads, ports, or borders. Therefore, a longer focal distance is required than an optical system using a small solid-state imaging device. Further, F-number of the optical system is obtained by the focal distance and the entrance pupil, and therefore a large entrance pupil is required for maintaining a brightness. Accordingly, a lens diameter of the first lens group G1 of the zoom lens becomes large. Specifically, the zoom ratio of the zoom lens of this embodiment is for example 10 times or more and 200 times or less, and preferably 19 times or more and 30 times or less. A diagonal length of the solid-state imaging device with the zoom lens of this embodiment connected thereto, is for example 8 mm (so-called ½ inches) or more and 11 mm (so-called ⅔ inches) or less. Further, the lens diameter of a maximum lens (for example lens L1) of the zoom lens is for example 50 mm or more and 100 mm or less.

Parameters of each lens group of the zoom lens according to this embodiment will be described next.

For example, the zoom lens of this embodiment satisfies the following conditional formula (1).

$$0.45 < f1/ft < 0.6 \tag{1}$$

wherein
f1: focal distance of the first lens group G1
ft: focal distance of a total lens system at the telephoto end.

Preferably, the zoom lens of this embodiment satisfies the following conditional formula (1').

$$0.5 < f1/ft < 0.6 \tag{1'}$$

Since f1/ft is larger than the abovementioned lower limit value, the refractive power of each lens group can be suppressed in a prescribed range, and a high optical performance can be obtained in the entire zoom range. Since f1/ft is smaller than the abovementioned upper limit value, the zoom lens can be miniaturized.

Further, the zoom lens of this embodiment satisfies the following conditional formulas (2) to (5).

$$1 < f4/|f2| < 2.5 \tag{2}$$

$$0.83 < f3/f4 < 3 \tag{3}$$

$$0.5 < \beta t4/\beta w4 < 1.7 \tag{4}$$

$$\beta t4 < 0.6 \tag{5}$$

wherein
f2: focal distance of the second lens group G2
f3: focal distance of the third lens group G3
f4: focal distance of the fourth lens group G4
βw4: lateral magnification of the fourth lens group G4 at the wide angle end
βt4: lateral magnification of the fourth lens group G4 at the telephoto end.

Preferably, the zoom lens of this embodiment satisfies the following conditional formulas (2') to (5').

$$1 < f4/|f2| < 1.5 \tag{2'}$$

$$1 < f3/f4 < 2 \tag{3'}$$

$$0.9 < \beta t4/\beta w4 < 1.3 \tag{4'}$$

$$\beta t4 < 0.55 \tag{5'}$$

By satisfying the abovementioned conditional formula (2), an excellent balance can be maintained between the second lens group G2 as the variator lens group, and the fourth lens group G4 as the compensator lens group. Specifically, since f4/|f2| is larger than the abovementioned lower limit value, an aberration fluctuation can be suppressed at the time of zooming, and an excellent optical performance can be obtained in the entire zoom range. Since f4/|f2| is smaller than the abovementioned upper limit value, a good correction sensitivity of an image position can be obtained. Further, the moving amounts of the second lens group G2 and the fourth lens group G4 can be small in the vicinity of the telephoto end, and the second lens group G2 and the fourth lens group G4 can be easily moved by a cam mechanism.

By satisfying the abovementioned conditional formula (3), a suitable power arrangement can be given to the fourth lens group G4 as the compensator lens group. Specifically, since f3/f4 is larger than the abovementioned lower limit value, the zoom lens can be miniaturized. Since f3/f4 is smaller than the abovementioned upper limit value, deterioration of the optical performance can be suppressed at the time of zooming. Particularly, occurrence of a curve of the imaging plane can be suppressed, and a high optical performance can be obtained.

Further, by satisfying the abovementioned conditional formulas (4) and (5), a suitable power can be given to the fourth lens group G4 at the time of zooming.

Further, the fifth lens group G5 of this embodiment satisfies the following conditional formula (6).

$$n5B < n5A \tag{6}$$

wherein n5A: d line refractive index of the positive lens L15 included in the cemented lens of the fifth lens group G5 n5B: d line refractive index of the negative lens L16 included in the cemented lens of the fifth lens group G5

The "d line" means a light having a wavelength of 587.6 nm.

By satisfying the abovementioned conditional formula (6), the aberration fluctuation, particularly spherical aberration and coma aberration, can be suppressed at the time of zooming. That is, a high optical performance can be obtained.

(2) Effect of this Embodiment

According to this embodiment, one or a plurality of following effects can be exhibited.

(a) According to this embodiment, the second lens group G2 as the variator lens group is moved to the imaging plane Simg side from the object side along an optical axis Z1, and the fourth lens group G4 as the compensator lens group is moved along the optical axis Z1 in the state of fixing the first lens group G1, the third lens group G3, and the fifth lens group G5 at the time of zooming from the wide angle end to the telephoto end. Thus, by moving one variator lens group while maintaining the total optical length, zooming of the zoom lens can be easily performed. Further, the zoom lens of this embodiment is capable of decreasing a telephoto ratio at the telephoto end, while having five lens groups. Thus, a housing that houses the zoom lens can be made small.

(b) According to this embodiment, by using the fourth lens group as the compensator group, the power arrangement of each lens group can be suitably adjusted. Thus, a bright zoom lens having a high performance and large aperture ratio, can be provided.

(c) According to this embodiment, since the compensator group is arranged with a sufficient distance away from the imaging plane Simg, it is possible to suppress an interference of a lens drive mechanism, etc., with a lens mount. Accordingly, a standard of a mount for connecting the zoom lens thereto, is not limited, and a sufficient flange back can be secured. For example, the zoom lens of this embodiment can also be configured to be connected to widely popular C-mount or CS-mount.

(d) According to this embodiment, only the first lens group G1 which is a focusing lens group, moves along the optical axis Z1 at the time of focusing (act of bringing into focus). On the other hand, the second lens group G2, the third lens group G3, the fourth lens group G4, and the fifth lens group G5 are fixed. Thus, even if the zooming is performed, the moving amount of the focusing lens group is constant, and the focusing can be stably performed.

Here, the following case is considered: the fourth lens group serves as the compensator group and the focusing lens group, as a comparative example. In the comparative example, the moving amount of the fourth lens group is different between the wide angle end and the telephoto end at the time of focusing. In the comparative example, the moving locus of the fourth lens group is different depending on a photography distance, at the time of zooming. It may be difficult to make such a fourth lens group movable by the cam mechanism. Further, particularly when a size of the solid-state imaging device for connecting the zoom lens thereto is large and a lens diameter of the zoom lens is large, the moving amount of the fourth lens group becomes large at the time of focusing by increasing the focal distance of each lens group. Therefore, it may be difficult to give the focusing function to the fourth lens group.

On the other hand, according to this embodiment, the focusing function is collected to the first lens group G1 only. The lens group used for zooming and the focusing lens group are separated from each other. Thus, in the entire zoom range, the moving amount of the first lens group G1 can be the same. That is, deviation of the focus at the time of zooming can be suppressed, regardless of the photography distance. Further, particularly even when the size of the solid-state imaging device is large and the lens diameter of the zoom lens is large, stable focusing can be stably performed by the first lens group G1, without complicating the lens drive mechanism of the zoom lens. This embodiment is particularly effective for an optical system such as a monitoring camera not allowing a focus deviation to occur even when zooming is performed.

(e) According to this embodiment, the zoom lens having the abovementioned high performance is realized, even when the zoom lens does not have an aspherical surface lens. In addition, this embodiment is not limited thereto, and the zoom lens may have the aspherical lens.

Other Embodiment of the Present Invention

The abovementioned description is given for example as a suitable embodiment of the present invention, and the scope of the present invention is not limited thereto.

The abovementioned embodiment shows a case that the zoom lens is composed of five lens groups. However, the present invention is not limited thereto. The zoom lens may further have a lens, etc., substantially not having a power. The "lens substantially not having a power" means a lens, etc., in principle, not having a power that affects the optical performance of the zoom lens of this embodiment.

Further, the abovementioned embodiment shows a case that the first lens group G1 is the focusing lens group. However, the present invention is not limited thereto. The first lens group may be configured based on a so-called front inner focus system, which is composed of a fixed group and the focusing lens group.

Further, the abovementioned embodiment shows a case that the zoom lens is used for the monitoring camera. However, the present invention is not limited thereto. The zoom lens may be used for a video camera, an electronic still camera, or a broadcast camera.

EXAMPLES

Next, examples of the present invention will be described hereafter.

Example 1

Example 1 will be described using FIG. 1 to FIG. 5.

Figures 3A, 3B, 3C:
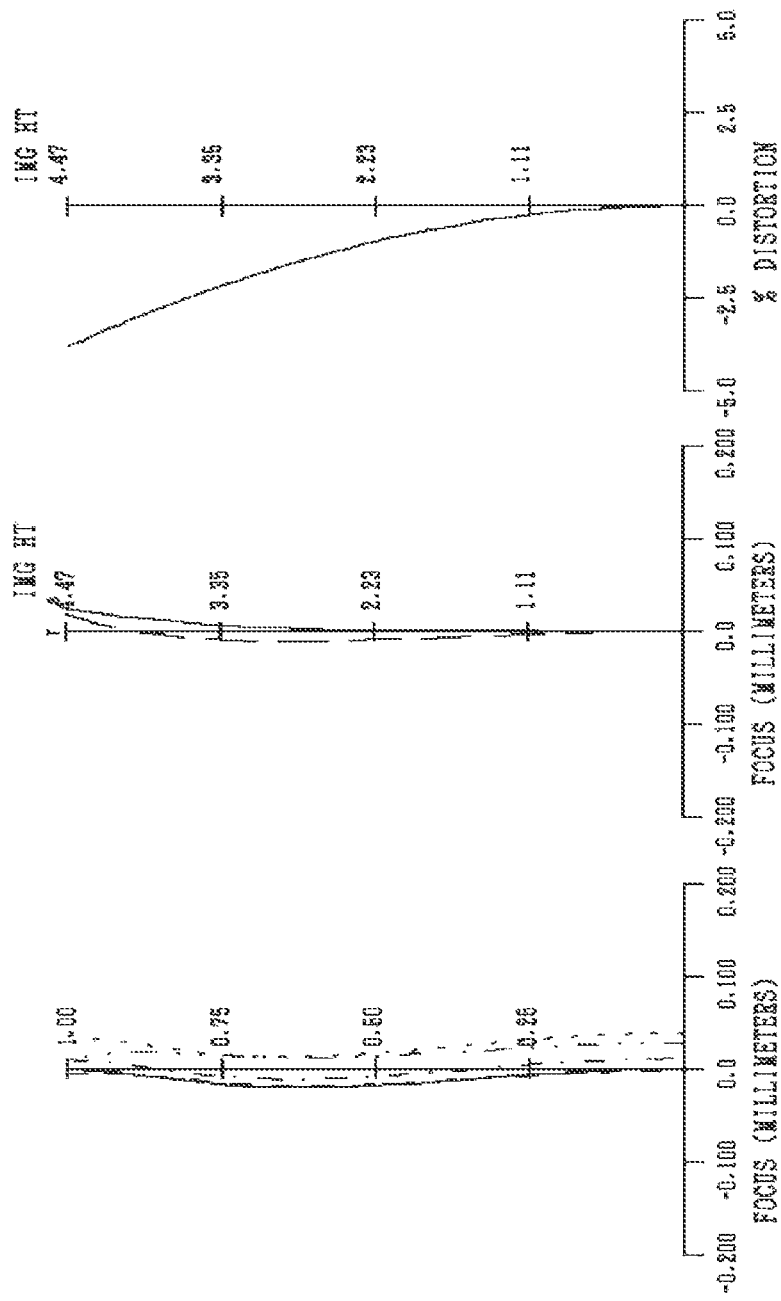

FIG. 1 is a cross-sectional view showing the configuration of the zoom lens of example 1 at a wide angle end. FIG. 2A is a view showing parameters of each lens group of the zoom lens of example 1, FIG. 2B is a view showing each parameter of the zoom lens of example 1 at a wide angle end, in an intermediate area, and at a telephoto end, FIG. 2C is a view showing the value of each conditional formula of the zoom lens of example 1, FIG. 3A to FIG. 3C are longitudinal aberration diagrams at the wide angle end of the zoom lens of example 1, wherein FIG. 3A is a spherical aberration diagram, FIG. 3B is an astigmatism diagram and astigmatic field curves diagram, FIG. 3C is a distortion diagram, and FIG. 3D to FIG. 3G are lateral aberration diagrams at the wide angle end of the zoom lens of example 1, FIG. 3D is a lateral aberration diagram in a meridional (tangential) direction at a half angle of view of 24.19°, FIG. 3E is a lateral aberration diagram in a sagittal direction at a half angle of view of 24.19°, FIG. 3F is a lateral aberration diagram in the meridional direction at a half angle of view of 17.13°, FIG. 3G is a lateral aberration diagram in the sagittal direction at a half angle of view of 17.13°, FIG. 3H is a spherical aberration diagram of FIG. 3A, and is a view showing a line type for a wavelength of a light in the lateral aberration diagram of FIG. 3D to FIG. 3G.

FIG. 4A to FIG. 4C are longitudinal aberration diagrams in an intermediate area of the zoom lens of example 1, wherein FIG. 4A is a spherical aberration diagram, FIG. 4B is an astigmatism diagram and astigmatic field curves diagram, FIG. 4C is a distortion aberration diagram, FIG. 4D to FIG. 4G are lateral aberration diagrams in the intermediate area of the zoom lens of example 1, FIG. 4D is a lateral aberration diagram in the meridional direction at a half angle of view of 3.312°, FIG. 4E is a lateral aberration diagram in the sagittal direction at a half angle of view of 3.312°, FIG. 4F is a lateral aberration diagram in the meridional direction at a half angle of view of 2.350°, FIG. 4G is a lateral aberration diagram in the sagittal direction at a half angle of view of 2.350°, FIG. 4H is a spherical aberration diagram of FIG. 4A, and is a view showing the line type for the wavelength of a light in the lateral aberration diagrams of FIG. 4D to FIG. 4G.

Figures 5D, 5E, 5F, 5G, 5H:
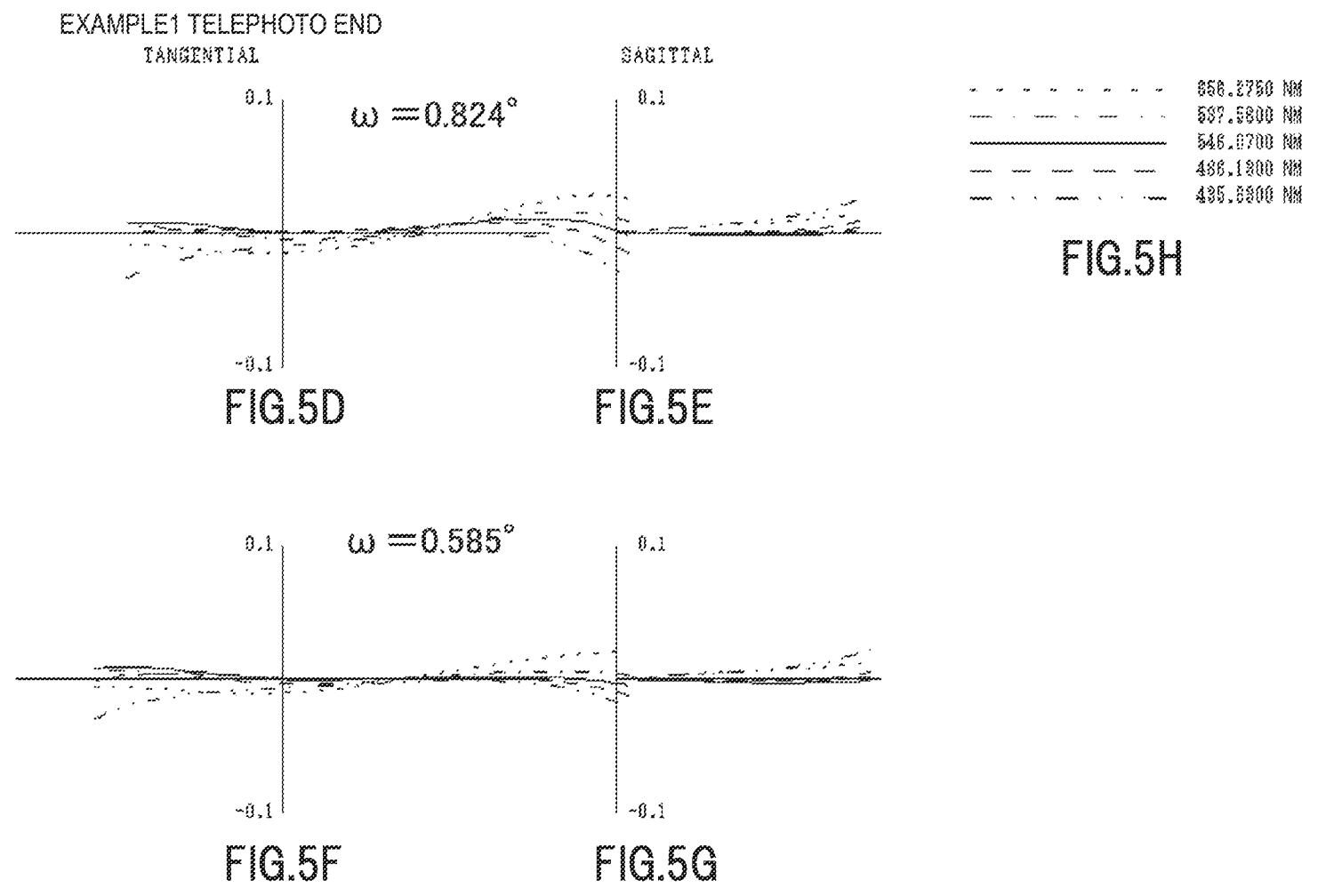

FIG. 5A to FIG. 5C are longitudinal aberration diagrams at the telephoto end of the zoom lens of example 1, wherein FIG. 5A is a spherical aberration diagram, FIG. 5B is an astigmatism diagram and astigmatic field curves diagram, FIG. 5C is a distortion aberration diagram, FIG. 5D to FIG. 5G are lateral aberration diagrams at the telephoto end of the zoom lens of example 1, FIG. 5D is a lateral aberration diagram in the meridional direction at a half angle of view of 0.824°, FIG. 5E is a lateral aberration diagram in the sagittal direction at a half angle of view of 0.824°, FIG. 5F is a lateral aberration diagram in the meridional direction at a half angle of view of 0.585°, FIG. 5G is a lateral aberration diagram in the sagittal direction at a half angle of view of 0.585°, FIG. 5H is a spherical aberration diagram of FIG. 5A, and is a view showing the line type for the wavelength of a light in the lateral aberration diagrams of FIG. 5D to FIG. 5G.

In FIG. 2A, surface number Ni indicates i-th surface number in FIG. 1, r indicates a curvature radius (unit mm) in each surface, d indicates a lens thickness and an air interval (surface interval) on the optical axis Z1 (unit mm) between the i-th surface and the (i+1)-th surface, nd indicates a d line refractive index of the i-th lens, and vd indicates the Abbe number obtained by the refractive index on each line of the d line, C line, and F line. The d line is one of a (bright) line spectra of helium (He), having a wavelength of 587.56 nm. C line is one of the (bright) line spectra of hydrogen (H), having a wavelength of 656.27 nm. Further, F line is one of the (bright) line spectra of hydrogen (H), having a wavelength of 486.13 nm. Further, in FIG. 3, A to D indicate the group interval (unit mm) of each lens group. The "telephoto ratio" is the ratio of the total optical length of the zoom lens with respect to the focal distance at the telephoto end. In this embodiment, the total optical length is the same value at the wide angle end, in the intermediate area, and at the telephoto end. Further, in FIGS. 5B and 5C, FIGS. 7B and 7C, and FIGS. 9B and 9C, the vertical axis indicates an image height (unit mm) on the imaging plane Simg. In addition, in FIG. 5B, FIG. 7B, and FIG. 9B, dot line (T) indicates an astigmatism diagram and an astigmatic field curves diagram on d line, on a meridional (tangential) surface, and solid line (S) indicates an astigmatism diagram and astigmatic field curves diagram on d line on a sagittal surface.

The configuration of each lens group of the zoom lens of example 1 has been described in the abovementioned embodiment.

As shown in FIG. 2A, the zoom lens of example 1 is configured to have a zoom ratio of 29 times.

As shown in FIG. 2B, in example 1, an aperture ratio of the zoom lens is large (F number is small). Further, a telephoto ratio of the zoom lens is 0.80, and the zoom lens is miniaturized.

As shown in FIG. 2C, the zoom lens of example 1 satisfies the conditional formulas (1) to (6).

As shown in FIG. 3A to FIG. 5G, in the zoom lens of example 1, each aberration is satisfactorily corrected. That is, it is found that the zoom lens of example 1 has an excellent optical performance.

In the following examples, explanation for a similar portion as example 1 is omitted.

Example 2

Example 2 will be described, using FIG. 6 to FIG. 10. Configurations of FIG. 6 to FIG. 10 are similar to the configurations of FIG. 1 to FIG. 5 of example 1.

Figure 6:
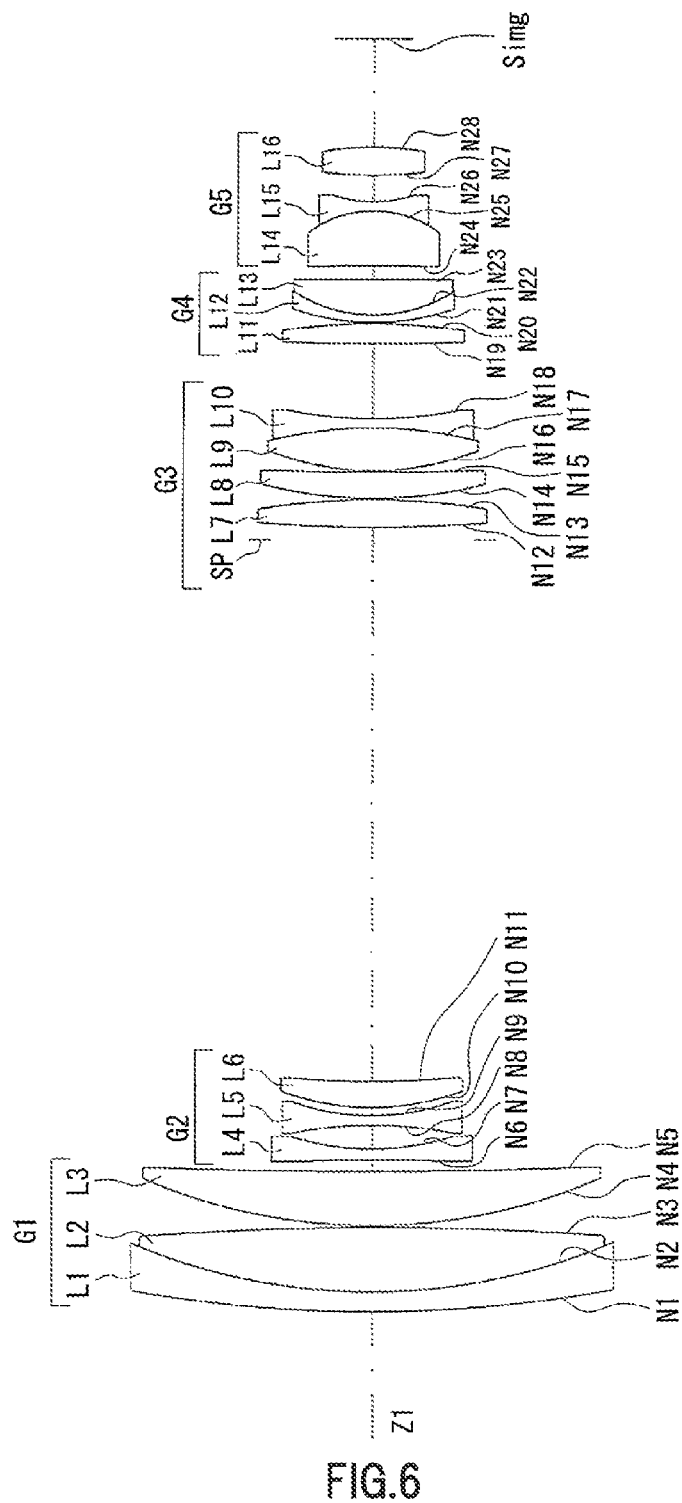
FIG. 6 is a cross-sectional view showing a configuration at the wide angle end of the zoom lens of example 2 according to an embodiment of the present invention.

As shown in FIG. 6, the zoom lens of example 2 has the following configuration.

The first lens group G1 consists of a cemented lens composed of an object side convex negative meniscus lens L1 and a double-sided positive lens L2, and an object side convex positive meniscus lens L3, sequentially from the object side.

The second lens group G2 consists of a double-sided concave negative lens L4, a double-sided concave negative lens L5, and an object side convex positive meniscus lens L6, sequentially from the object side.

The third lens group G3 includes a diaphragm SP, a double-sided convex positive lens L7, a double-sided convex positive lens L8, and a cemented lens composed of a double-sided convex positive lens L9 and a double-sided concave negative lens L10, sequentially from the object side.

The fourth lens group G4 consists of a double-sided convex positive lens L11, and a cemented lens composed of an object side convex negative meniscus lens L12, and an object side convex positive meniscus lens L13, sequentially from the object side.

The fifth lens group G5 consists of a cemented lens composed of a double-sided convex positive lens L14 and a double-sided concave negative lens L15, and a double-sided convex positive lens L16, sequentially from the object side.

As shown in FIG. 7A, the zoom lens of example 2 is configured to have a zoom ratio of 19 times.

As shown in FIG. 7B, in example 2, the aperture ratio of the zoom lens is large (F number is small). Also, the telephoto ratio of the zoom lens is 0.89, and the zoom lens is miniaturized.

As shown in FIG. 7C, the zoom lens of example 2 satisfies the conditional formulas (1) to (6).

As shown in FIG. 8A to FIG. 10G, in the zoom lens of example 2, each aberration is satisfactorily corrected. That is, it is found that the zoom lens of example 2 has an excellent optical performance.

Example 3

Figures 23A, 23B, 23C:
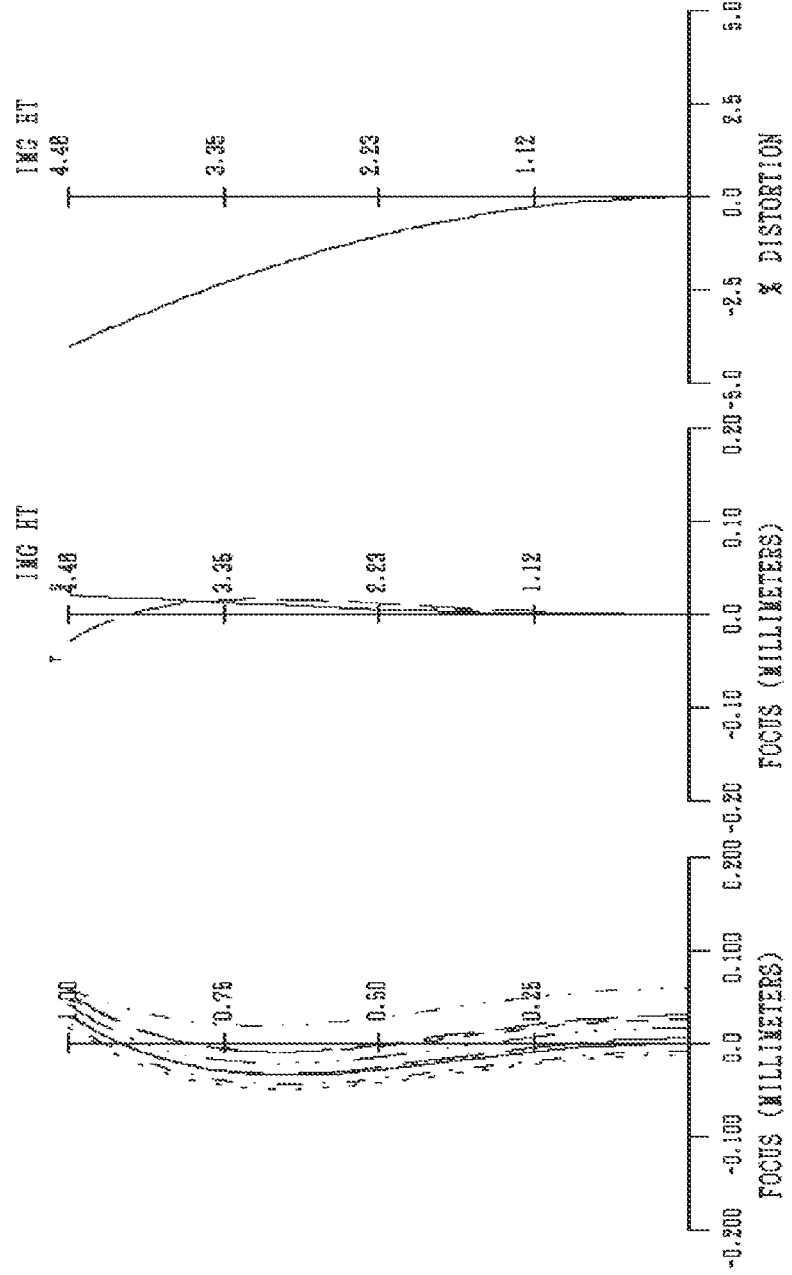

Example 3 will be described, using FIG. 11 to FIG. 15. The configurations of FIG. 11 to FIG. 15 are similar to the configurations of FIG. 1 to FIG. 5 of example 1. It should be noted that the line types for the wavelength of the light in the spherical aberration diagram of (a) and the lateral aberration diagrams of (d) to (g) in each of FIG. 23 to FIG. 25, are different from the line types in each of FIG. 3 to FIG. 5.

Figure 11:
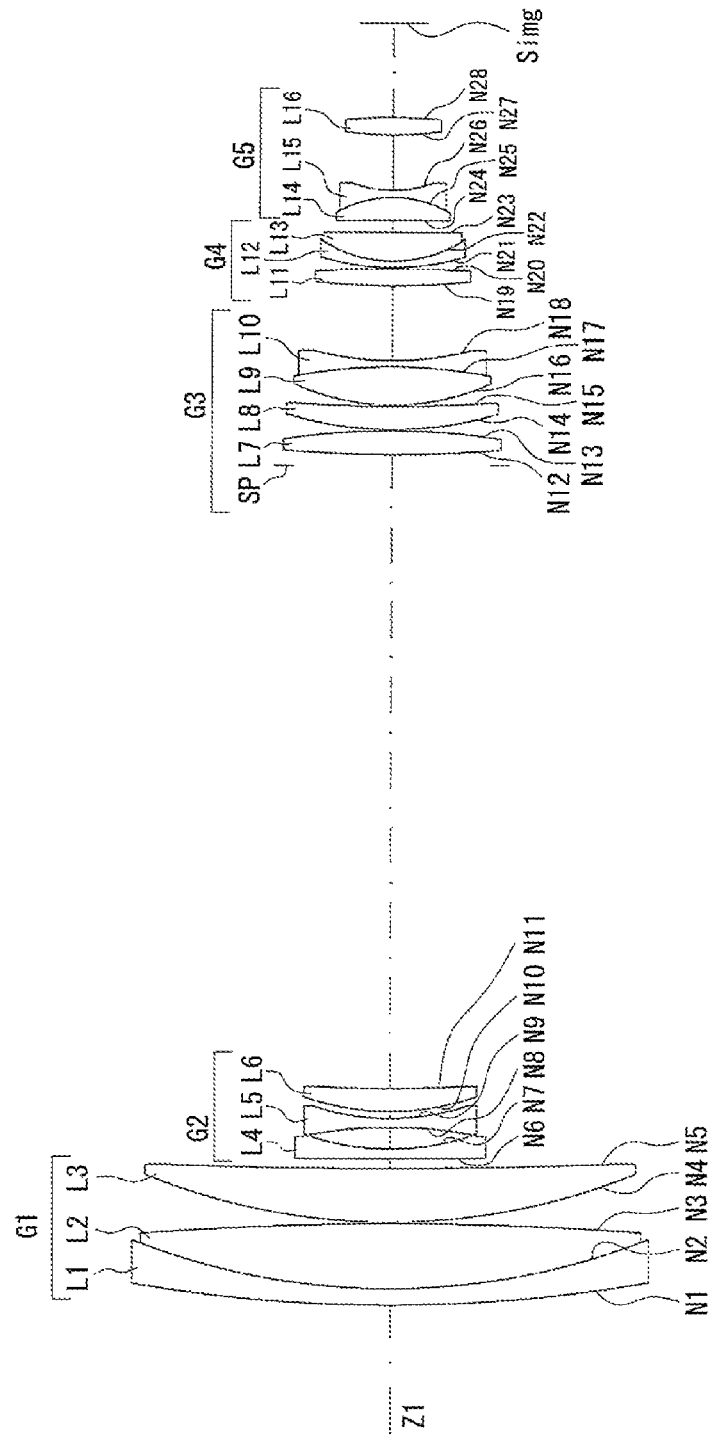
FIG. 11 is a cross-sectional view showing a configuration at the wide angle end of the zoom lens of example 3 according to an embodiment of the present invention.

As shown in FIG. 11, the zoom lens of example 3 has the following configuration.

The first lens group G1 consists of a cemented lens composed of an object side convex negative meniscus lens L1 and a double-sided convex positive lens L2, and an object side convex positive meniscus lens L3, sequentially from the object side.

The second lens group G2 consists of an object side convex negative meniscus lens L4, a double-sided concave negative lens L5, and an object side convex positive meniscus lens L6, sequentially from the object side.

The third lens group G3 consists of a diagram SP, a double-sided convex positive lens L7, an object side convex positive meniscus lens L8, and a cemented lens composed of a double-sided convex positive lens L9 and a double-sided concave negative lens L10.

The fourth lens group G4 consists of a double-sided convex positive lens L11, and a cemented lens composed of an object side convex negative meniscus lens L12 and an object side convex positive meniscus lens L13, sequentially from the object side.

The fifth lens group G5 consists of a cemented lens composed of an object side concave positive meniscus lens L14 and a double-sided concave negative lens L15, and a double-sided convex positive lens L16, sequentially from the object side.

As shown in FIG. 12A, the zoom lens of example 3 is configured to have a zoom ratio of 23 times.

As shown in FIG. 12B, in example 3, the aperture ratio of the zoom lens is large (F number is small). Also, the telephoto ratio of the zoom lens is 0.85, and the zoom lens is miniaturized.

As shown in FIG. 12C, the zoom lens of example 3 satisfies the conditional formulas (1) to (6).

As shown in FIG. 13A to FIG. 15G, in the zoom lens of example 3, each aberration is satisfactorily corrected. That is, it is found that the zoom lens of example 3 has an excellent optical performance.

Example 4

Example 4 will be described, using FIG. 16 to FIG. 20. The configurations of FIG. 16 to FIG. 20 are similar to the configurations of FIG. 1 to FIG. 10 of example 1.

Figure 16:
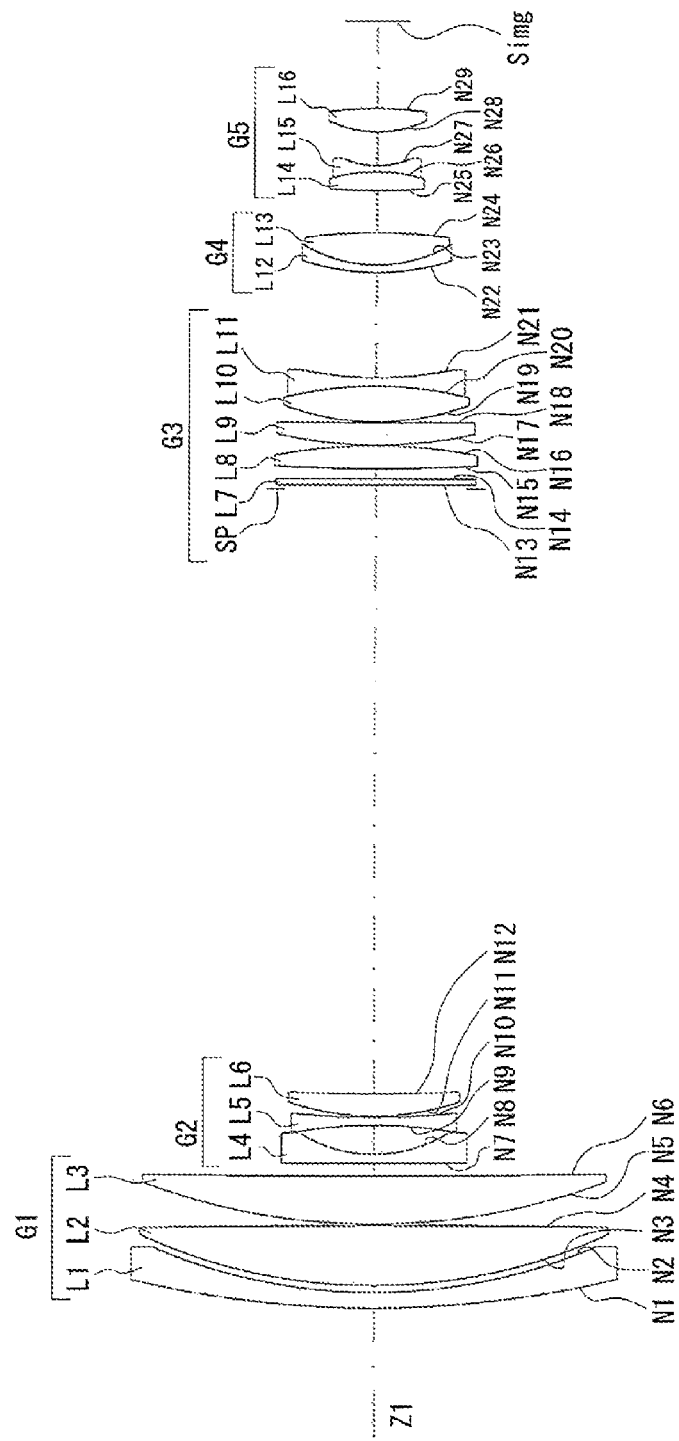
FIG. 16 is a cross-sectional view showing a configuration at the wide angle end of the zoom lens of example 4 according to an embodiment of the present invention.
Figure 18D:
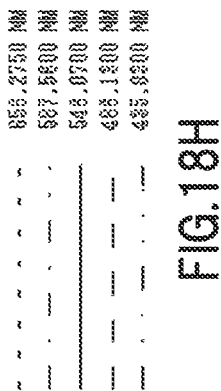
FIG. 18D to FIG. 18G are lateral aberration diagrams at the wide angle end of the zoom lens of example 4.
Figure 18E:
Figure 18F:
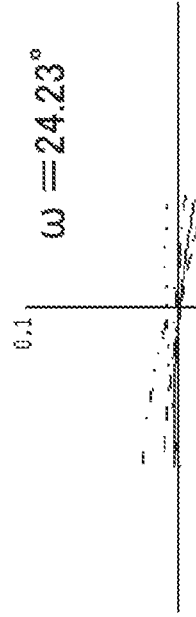
Figure 18G:
Figure 18H:
FIG. 18H is a spherical aberration diagram of FIG. 18A, and is a view showing the line type for the wavelength of a light in the lateral aberration diagrams of FIG. 18D to FIG. 18G.

As shown in FIG. 16, the zoom lens of example 4 has the following configuration.

The first lens group G1 consists of an object side convex negative meniscus lens L1, a double-sided convex positive lens L2, and an object side convex positive meniscus lens L3, sequentially from the object side.

The second lens group G2 consists of an object side convex negative meniscus lens L4, a double-sided concave negative lens L5, and an object side convex positive meniscus lens L6, sequentially from the object side.

The third lens group G3 consists of a diaphragm SP, a parallel plate L7, a double-sided convex positive lens L8, an object side convex positive meniscus lens L9, and a cemented lens composed of a double-sided convex positive lens L10 and a double-sided concave negative lens L11, sequentially from the object side.

The fourth lens group G4 consists of a cemented lens composed of an object side convex negative meniscus lens L12, and a double-sided convex positive lens L13, sequentially from the object side.

The fifth lens group G5 consists of a cemented lens composed of a double-sided convex positive lens L14 and a double-sided concave negative lens L15, and a double-sided convex positive lens L16, sequentially from the object side.

As shown in FIG. 17A, the zoom lens of example 4 is configured to have a zoom ratio of 23 times.

As shown in FIG. 17B, in example 4, the aperture ratio of the zoom lens is large (F number is small). Also, the telephoto ratio of the zoom lens is 0.85, and the zoom lens is miniaturized.

As shown in FIG. 17C, the zoom lens of example 4 satisfies the conditional formulas (1) to (6).

As shown in FIG. 18A to FIG. 20G, in the zoom lens of example 4, each aberration is satisfactorily corrected. That is, it is found that the zoom lens of example 4 has an excellent optical performance.

Example 5

Example 5 will be described, using FIG. 21 to FIG. 25. The configurations of FIG. 21 to FIG. 25 are similar to the configurations of FIG. 1 to FIG. 10 of example 1.

Figure 21:
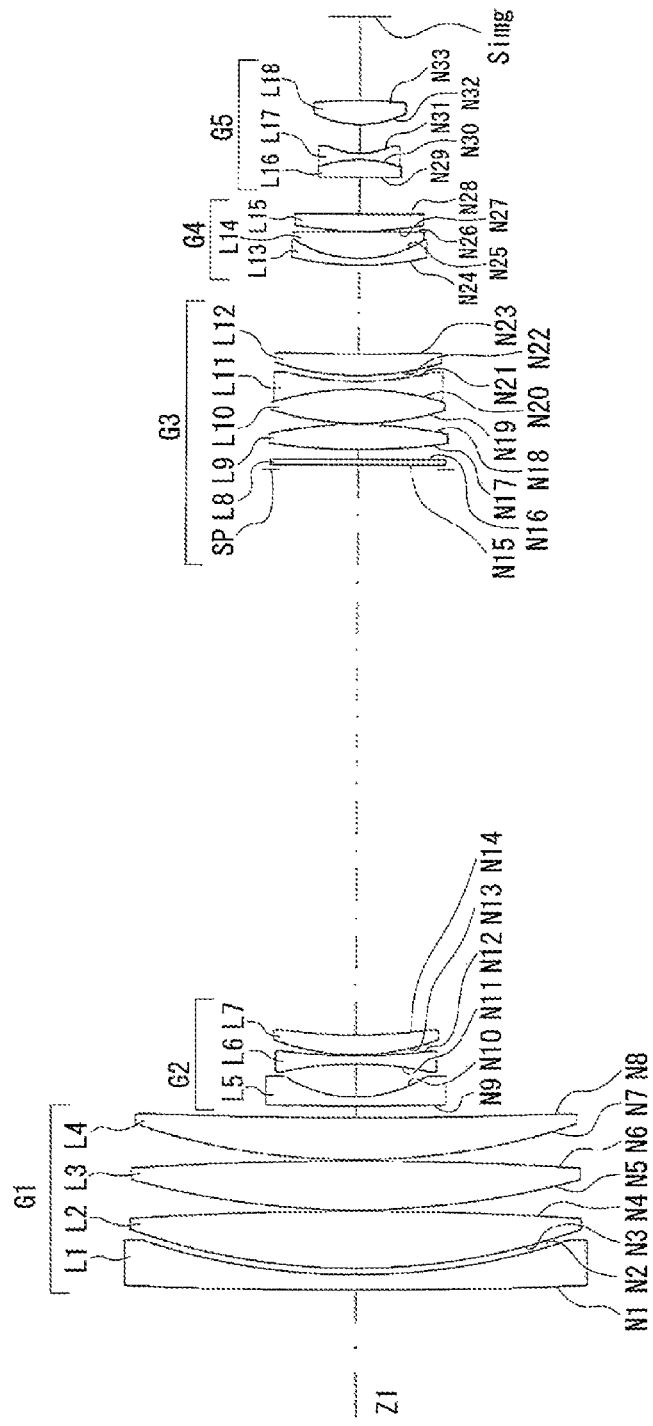
FIG. 21 is a cross-sectional view showing a configuration at the wide angle end of the zoom lens of example 5 according to an embodiment of the present invention.

As shown in FIG. 21, the zoom lens of example 5 has the following configuration.

The first lens group G1 consists of an object side convex negative meniscus lens L1, a double-sided convex positive lens L2, a double-sided convex positive lens L3, and an object side convex positive meniscus lens L4, sequentially from the object side.

The second lens group G2 consists of an object side convex negative meniscus lens L5, a double-sided concave negative lens L6, and an object side convex positive meniscus lens L7, sequentially from the object side.

The third lens group G3 consists of a diaphragm SP, a parallel plate L8, a double-sided convex positive lens L9, a cemented lens composed of a double-sided convex positive lens L10 and a double-sided concave negative lens L11, and an object side convex positive meniscus lens L12, sequentially from the object side.

The fourth lens group G4 consists of a cemented lens composed of an object side convex negative meniscus lens L13 and an object side convex positive meniscus lens L14, and an object side convex positive meniscus lens L15, sequentially from the object side.

The fifth lens group G5 consists of a cemented lens composed of a double-sided convex positive lens L16 and a double-sided concave negative lens L17, and a double-sided convex positive lens L18, sequentially from the object side.

As shown in FIG. 22A, the zoom lens of example 5 is configured to have a zoom ratio of 23 times.

As shown in FIG. 22B, in example 5, an aperture ratio of the zoom lens is large (F number is small). Further, a telephoto ratio of the zoom lens is 0.85, and the zoom lens is miniaturized.

As shown in FIG. 22C, the zoom lens of example 5 satisfies the conditional formulas (1) to (6).

As shown in FIG. 23A to FIG. 25G, in the zoom lens of example 5, each aberration is satisfactorily corrected. That is, it is found that the zoom lens of example 5 has an excellent optical performance.

According to the abovementioned examples 1 to 5, a zoom lens can be provided, which is capable of achieving both of obtaining a high optical performance in the entire zoom range at a high zoom ratio, and shortening the total optical length of the zoom lens.

What is claimed is:

1. A zoom lens comprising:
a first lens group having a positive refractive power, the first lens group having a focusing function;
a second lens group having a negative refractive power, the second lens group having a variator function of performing zooming;
a third lens group having a positive refractive power, the third lens group having a diaphragm;
a fourth lens group having a positive refractive power, the fourth lens group having a compensator function of correcting a position of an imaging plane at the time of zooming; and
a fifth lens group having one of a positive refractive power and a negative refractive power,
wherein the first, second, third, fourth, and fifth lens groups are sequentially provided from an object side,
wherein the second lens group is moved to the imaging plane side from the object side along an optical axis and the fourth lens group is moved along the optical axis while the first lens group, the third lens group, and the fifth lens group are fixed at the time of zooming from a wide angle end to a telephoto end, and
only the first lens group is moved along the optical axis at the time of focusing, and
the first lens group is composed of three or more lenses including at least one concave lens, and the following formula (1) is satisfied:

$$0.45 < f1/ft < 0.6 \quad (1)$$

wherein
f1 is a focal distance of the first lens group, and
ft is a focal distance of a total lens system at the telephoto end.

2. The zoom lens according to claim 1, wherein the fourth lens group includes at least two lenses, and the following formulas (2) to (5) are satisfied:

$$1 < f4/|f2| < 2.5 \quad (2)$$

$$0.83 < f3/f4 < 3 \quad (3)$$

$$0.5 < \beta t4/\beta w4 < 1.7 \quad (4)$$

$$\beta t4 < 0.6 \quad (5)$$

wherein
f2 is a focal distance of the second lens group,
f3 is a focal distance of the third lens group,
f4 is a focal distance of the fourth lens group, βw4 is lateral magnification of the fourth lens group at the wide angle end, and
βt4 is lateral magnification of the fourth lens group at the telephoto end.

3. The zoom lens according to claim 1, wherein the fifth lens group includes at least three lenses, and two of the three lenses of the fifth lens group are located at the object side and are configured as a cemented lens composed of a positive lens and a negative lens sequentially from the object side, and the following formula (6) is satisfied:

$$n5B < n5A \quad (6)$$

wherein
n5A is a d line refractive index of the positive lens included in the cemented lens of the fifth lens group, and
n5B is a d line refractive index of the negative lens included in the cemented lens of the fifth lens group.

4. The zoom lens according to claim 1, wherein the fourth lens group includes at least two lenses, and the fifth lens group includes at least three lenses, and two of the three lenses of the fifth lens group are located at the object side and are configured as a cemented lens composed of a positive lens and a negative lens sequentially from the object side, and the following formulas (2) to (6) are satisfied:

$$1 < f4/|f2| < 2.5 \quad (2)$$

$$0.83 < f3/f4 < 3 \quad (3)$$

$$0.5 < \beta t4/\beta w4 < 1.7 \quad (4)$$

$$\beta t4 < 0.6 \quad (5)$$

$$n5B < n5A \quad (6)$$

wherein
f2 is a focal distance of the second lens group,
f3 is a focal distance of the third lens group,
f4 is a focal distance of the fourth lens group,
βw4 is lateral magnification of the fourth lens group at the wide angle end,
βt4 is lateral magnification of the fourth lens group at the telephoto end,
n5A is a d line refractive index of the positive lens included in the cemented lens of the fifth lens group, and
n5B is a d line refractive index of the negative lens included in the cemented lens of the fifth lens group.

5. A zoom lens comprising:
a first lens group having a positive refractive power, the first lens group having a focusing function;
a second lens group having a negative refractive power, the second lens group having a variator function of performing zooming;
a third lens group having a positive refractive power, the third lens group having a diaphragm;
a fourth lens group having a positive refractive power, the fourth lens group having a compensator function of correcting a position of an imaging plane at the time of zooming; and
a fifth lens group having one of a positive refractive power and a negative refractive power,
wherein the first, second, third, fourth, and fifth lens groups are sequentially provided from an object side,
wherein the second lens group is moved to an imaging plane side from the object side along an optical axis and the fourth lens group is moved along the optical axis while the first lens group, the third lens group, and the fifth lens group are fixed at the time of zooming from a wide angle end to a telephoto end, and only the first lens group is moved along the optical axis at the time of focusing, and wherein the fourth lens group includes at least two lenses, and the following formulas (2) to (5) are satisfied:

$$1 < f4/|f2| < 2.5 \quad (2)$$

$$0.83 < f3/f4 < 3 \quad (3)$$

$$0.5 < \beta t4/\beta w4 < 1.7 \quad (4)$$

$$\beta t4 < 0.6 \quad (5)$$

wherein f2 is a focal distance of the second lens group, f3 is a focal distance of the third lens group, f4 is a focal distance of the fourth lens group, $\beta w4$ is lateral magnification of the fourth lens group at the wide angle end, and $\beta t4$ is lateral magnification of the fourth lens group at the telephoto end.

6. The zoom lens according to claim 5, wherein the fifth lens group includes at least three lenses, and two of the three lenses of the fifth lens group are located at the object side and are configured as a cemented lens composed of a positive lens and a negative lens sequentially from the object side, and the following formula (6) is satisfied:

$$n5B < n5A \quad (6)$$

wherein n5A is a d line refractive index of the positive lens included in the cemented lens of the fifth lens group, and n5B is a d line refractive index of the negative lens included in the cemented lens of the fifth lens group.

7. A zoom lens comprising:

a first lens group having a positive refractive power, the first lens group having a focusing function;

a second lens group having a negative refractive power, the second lens group having a variator function of performing zooming;

a third lens group having a positive refractive power, the third lens group having a diaphragm;

a fourth lens group having a positive refractive power, the fourth lens group having a compensator function of correcting a position of an imaging plane at the time of zooming; and a fifth lens group having one of a positive refractive power and a negative refractive power, wherein the first, second, third, fourth, and fifth lens groups are sequentially provided from an object side, wherein the second lens group is moved to an imaging plane side from the object side along an optical axis and the fourth lens group is moved along the optical axis while the first lens group, the third lens group, and the fifth lens group are fixed at the time of zooming from a wide angle end to a telephoto end, and only the first lens group is moved along the optical axis at the time of focusing, and wherein the first lens group is composed of three or more lenses including at least one concave lens, the fourth lens group includes at least two lenses, and the following formulas (1) and (2) are satisfied:

$$0.45 < f1/ft < 0.6 \quad (1)$$

$$1 < f4/|f2| < 2.5 \quad (2)$$

wherein f1 is a focal distance of the first lens group, ft is a focal distance of a total lens system at the telephoto end, f2 is a focal distance of the second lens group, and f4 is a focal distance of the fourth lens group.

8. The zoom lens according to claim 7, wherein the following formulas (3) and (4) are satisfied:

$$0.83 < f3/f4 < 3 \quad (3)$$

$$0.5 < \beta t4/\beta w4 < 1.7 \quad (4)$$

wherein f3 is a focal distance of the third lens group, $\beta w4$ is lateral magnification of the fourth lens group at the wide angle end, and $\beta t4$ is lateral magnification of the fourth lens group at the telephoto end.

9. The zoom lens according to claim 8, wherein the fifth lens group includes at least three lenses, and two of the three lenses of the fifth lens group are located at the object side and are configured as a cemented lens composed of a positive lens and a negative lens sequentially from the object side, and the following formula (6) is satisfied:

$$n5B < n5A \quad (6)$$

wherein n5A is a d line refractive index of the positive lens included in the cemented lens of the fifth lens group, and n5B is a d line refractive index of the negative lens included in the cemented lens of the fifth lens group.

* * * * *